United States Patent
Shinkai et al.

(10) Patent No.: US 9,632,637 B2
(45) Date of Patent: Apr. 25, 2017

(54) SENSOR DEVICE, INPUT DEVICE, AND ELECTRONIC APPARATUS

(71) Applicant: Sony Corporation, Tokyo (JP)

(72) Inventors: Shogo Shinkai, Kanagawa (JP); Hayato Hasegawa, Kanagawa (JP); Hiroto Kawaguchi, Kanagawa (JP); Tomoko Katsuhara, Kanagawa (JP); Fumihiko Iida, Kanagawa (JP); Kei Tsukamoto, Kanagawa (JP); Takayuki Tanaka, Kanagawa (JP); Tomoaki Suzuki, Kanagawa (JP); Taizo Nishimura, Kanagawa (JP); Hiroshi Mizuno, Kanagawa (JP); Yasuyuki Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 417 days.

(21) Appl. No.: 14/463,043

(22) Filed: Aug. 19, 2014

(65) Prior Publication Data

US 2015/0070306 A1    Mar. 12, 2015

(30) Foreign Application Priority Data

Sep. 11, 2013   (JP) .................................. 2013-188679

(51) Int. Cl.
*G06F 3/044*  (2006.01)
*G06F 1/16*  (2006.01)

(52) U.S. Cl.
CPC ............ *G06F 3/044* (2013.01); *G06F 1/1626* (2013.01); *G06F 2203/04106* (2013.01)

(58) Field of Classification Search
CPC ......... G06F 1/1626; G06F 2203/04106; G06F 3/044

USPC ........................ 345/174; 324/658; 178/18.06
See application file for complete search history.

(56) References Cited

U.S. PATENT DOCUMENTS

| 8,179,376 B2 * | 5/2012 | Griffin | .................. G06F 3/0416 345/157 |
| 8,421,483 B2 * | 4/2013 | Klinghult | ................ G06F 3/044 324/658 |
| 8,493,364 B2 * | 7/2013 | Charlier | ................ G06F 1/1616 345/173 |

(Continued)

FOREIGN PATENT DOCUMENTS

JP    2011-170659    9/2011

*Primary Examiner* — Dmitriy Bolotin
(74) *Attorney, Agent, or Firm* — K&L Gates LLP

(57) ABSTRACT

A sensor device includes: a first sensor including a first electrode board including a plurality of first capacitive elements arranged in a matrix, a first conductor layer facing the first electrode board, a first support layer arranged between the first electrode board and the first conductor layer, the first support layer being deformable, and a first operation input surface provided on the first electrode board or the first conductor layer, the first electrode board and/or the first conductor layer being flexible; and a second sensor layered on the first sensor, the second sensor including a second electrode board including a plurality of second capacitive elements, a second conductor layer facing the second electrode board, and a second support layer arranged between the second electrode board and the second conductor layer, the second support layer being deformable, the second electrode board and/or the second conductor layer being flexible.

30 Claims, 21 Drawing Sheets

(56) References Cited

U.S. PATENT DOCUMENTS

| | | | |
|---|---|---|---|
| 2007/0248799 A1* | 10/2007 | DeAngelis | G01L 1/146 428/209 |
| 2009/0073134 A1* | 3/2009 | Huang | G06F 3/041 345/173 |
| 2012/0206401 A1* | 8/2012 | Lin | G06F 3/044 345/174 |
| 2014/0009434 A1* | 1/2014 | Hiroyuki | G06F 3/044 345/174 |
| 2015/0068882 A1* | 3/2015 | Huang | G06F 3/044 200/5 R |
| 2015/0084868 A1* | 3/2015 | Tenuta | G06F 3/0213 345/168 |

\* cited by examiner

SENSOR DEVICE, INPUT DEVICE, AND ELECTRONIC APPARATUS

CROSS REFERENCES TO RELATED APPLICATIONS

The present application claims priority to Japanese Priority Patent Application JP 2013-188679 filed in the Japan Patent Office on Sep. 11, 2013, the entire content of which is hereby incorporated by reference.

BACKGROUND

The present disclosure relates to a sensor device, an input device, and an electronic apparatus capable of electrostatically detecting an input operation.

For example there is known a sensor device for an electronic apparatus including a capacitive element. When an operating member inputs an operation on an operation input surface, the sensor device is capable of detecting the operated position and the pressing force (for example see Japanese Patent Application Laid-open No. 2011-170659).

SUMMARY

According to a recent user-friendly input method, a user makes gestures by moving his fingers to thereby input operations. If it is possible to detect operations input in an operation surface with a higher degree of accuracy and more stably, more variety of input operations may be allowed.

In view of the above-mentioned circumstances, it is desirable to provide a sensor device, an input device, and an electronic apparatus capable of detecting input operations with a higher degree of accuracy.

According to an embodiment of the present technology, there is provided a sensor device including a first sensor and a second sensor.

The first sensor includes a first electrode board including a plurality of first capacitive elements arranged in a matrix, a first conductor layer facing the first electrode board, a first support layer arranged between the first electrode board and the first conductor layer, the first support layer being deformable, and a first operation input surface provided on one of the first electrode board and the first conductor layer, at least one of the first electrode board and the first conductor layer being flexible.

The second sensor is layered on the first sensor, the second sensor including a second electrode board including a plurality of second capacitive elements, a second conductor layer facing the second electrode board, and a second support layer arranged between the second electrode board and the second conductor layer, the second support layer being deformable, at least one of the second electrode board and the second conductor layer being flexible.

The above-mentioned sensor device includes two electrode boards, i.e., the first and second electrode boards. With this structure, the sensor device is capable of detecting an operation input in the first operation input surface with a high degree of accuracy.

The first operation input surface may be provided on the first conductor layer, and the first electrode board may be layered on the second electrode board.

In this case, it is possible to detect an input operation based on capacitance change of the first capacitive elements resulting from change of the distance between the first conductor layer and the first electrode board, and based on capacitance change of the second capacitive elements resulting from change of the distance between the second conductor layer and the second electrode board.

The sensor device may further include a third conductor layer arranged between the first electrode board and the second electrode board.

With this structure, it is possible to prevent electromagnetic interference from occurring between the first electrode board and the second electrode board.

The first operation input surface may be provided on the first electrode board, and the first conductor layer may be layered on the second electrode board.

Alternatively, the first operation input surface may be provided on the first conductor layer, and the first electrode board may be layered on the second conductor layer.

With this structure, also, it is possible to detect an input operation based on capacitance change of the first capacitive elements and based on capacitance change of the second capacitive elements.

Alternatively, the first operation input surface may be provided on the first electrode board, and a common conductor layer may be configured to function as the first conductor layer and the second conductor layer.

In this case, an input operation is detected based on capacitance change of the first capacitive elements resulting from change of the distance between the conductor layer and the first electrode board, and based on capacitance change of the second capacitive elements resulting from change of the distance between the conductor layer and the second electrode board.

The plurality of second capacitive elements may be arranged in a matrix on the second electrode board.

With this structure, it is possible to increase sensitivity of detecting operations input in the second electrode board.

When an operation is input in the first operation input surface, capacitance changes of the plurality of second capacitive elements may be larger than capacitance changes of the plurality of first capacitive elements.

With this structure, for example it is possible to easily distinguish between the kinds of operating members (for example, finger, stylus pen, etc.). It is possible to detect input operations with a high degree of accuracy.

The centers of the plurality of first capacitive elements may be displaced from the centers of the plurality of second capacitive element, respectively, seen in the layered direction of the first sensor and the second sensor. Alternatively, the centers of the plurality of first capacitive elements may face the centers of the plurality of second capacitive elements, respectively.

The first support layer may include a plurality of first columns.

With this structure, the first conductor layer or the first electrode board deforms easily. With this structure, detection sensitivity may be increased.

The second support layer may include a plurality of second columns.

With this structure, the second conductor layer or the second electrode board deforms easily. With this structure, detection sensitivity may be increased.

Alternatively, the first support layer may include a plurality of first columns, the plurality of first columns facing the centers of the plurality of second capacitive elements, respectively, and the second support layer may include a plurality of second columns, the plurality of second columns facing the centers of the plurality of first capacitive elements, respectively.

The plurality of first columns face the centers of the plurality of second capacitive elements, respectively. With this structure, the second conductor layer or the second electrode board deforms easily. So detection sensitivity may be further increased.

Further, the plurality of second columns face the centers of the plurality of first capacitive elements, respectively. With this structure, the first conductor layer or the first electrode board deforms easily. So detection sensitivity may be further increased.

The first electrode board may include a plurality of first electrode wires, and a plurality of second electrode wires intersecting with the plurality of first electrode wires, the plurality of first capacitive elements being formed on intersection areas of the plurality of first electrode wires and the plurality of second electrode wires. The second electrode board may include a plurality of third electrode wires facing the plurality of first electrode wires, and a plurality of fourth electrode wires intersecting with the plurality of third electrode wires, the plurality of second capacitive elements being formed on intersection areas of the plurality of third electrode wires and the plurality of fourth electrode wires.

At least ones of the plurality of first electrode wires and the plurality of second electrode wires may include sub-electrodes in areas corresponding to the plurality of first capacitive elements. At least ones of the plurality of second electrode wires and the plurality of fourth electrode wires may include sub-electrodes in areas corresponding to the plurality of second capacitive elements. Ones of the plurality of first electrode wires and the plurality of second electrode wires may be arranged on the first support layer and include sub-electrodes. Ones of the plurality of third electrode wires and the plurality of fourth electrode wires may be arranged on the second support layer and include sub-electrodes.

Common electrode wires may be configured to function as the plurality of second electrode wires and the plurality of fourth electrode wires.

In this case, if the second and fourth electrode wires are used as driver electrodes, the common driver electrode wires are capable of driving the first and second capacitive elements.

The plurality of second electrode wires may be wider than the plurality of first electrode wires. The plurality of fourth electrode wires may be wider than the plurality of third electrode wires.

In this case, preferably the distance between the plurality of first electrode wires and the first support layer is smaller than the distance between the plurality of second electrode wires and the first support layer. Preferably the distance between the plurality of third electrode wires and the second support layer may be smaller than the distance between the plurality of fourth electrode wires and the second support layer. Further, in this case, preferably the plurality of second electrode wires face the plurality of fourth electrode wires.

With this structure, the second and fourth electrode wires may have shield functions, and detection sensitivity may thus be increased.

The sensor device may further include a controller electrically connecting with the first electrode board and the second electrode board. The controller is configured to generate a control signal in response to an operation input in the first operation input surface based on capacitance change of the plurality of first capacitive elements and capacitance change of the plurality of second capacitive elements.

The controller may include a first controller device electrically connecting with the first electrode board, and a second controller device electrically connecting with the second electrode board.

The first sensor may further include a third support layer arranged between the first operation input surface and the first electrode board.

The sensor device may further include a rigid layer arranged between the first sensor and the second sensor, rigidity of the rigid layer being higher than rigidity of the first sensor and rigidity of the second sensor.

With this structure, it is possible to detect operations input in the first sensor and operations input in the second sensor.

The sensor device may further include a protrusion member facing the second sensor, the protrusion member partially supporting the second sensor.

The protrusion member is not limited and for example one of a chassis, a clasp, a circuit board, a wiring, a battery, a shock-absorbing material, and the like.

The plurality of second capacitive elements may face the protrusion member.

With this structure, for example, it is possible to detect reactive force applied to the second sensor when an operation is input in the first sensor.

The second sensor may further include a second operation input surface provided on one of the second electrode board and the second conductor layer.

The first sensor may further include a display unit layered on at least one of the first conductor layer and the first electrode board, and the first operation input surface may be a display surface of the display unit.

According to an embodiment of the present technology, there is provided an input device including a first sensor, a second sensor, and a controller.

The first sensor includes a first electrode board including a plurality of first capacitive elements arranged in a matrix, a first conductor layer facing the first electrode board, a first support layer arranged between the first electrode board and the first conductor layer, the first support layer being deformable, and a first operation input surface provided on one of the first electrode board and the first conductor layer, at least one of the first electrode board and the first conductor layer being flexible.

The second sensor is layered on the first sensor, the second sensor including a second electrode board including a plurality of second capacitive elements, a second conductor layer facing the second electrode board, and a second support layer arranged between the second electrode board and the second conductor layer, the second support layer being deformable, at least one of the second electrode board and the second conductor layer being flexible.

The controller electrically connects with the first electrode board and the second electrode board, the controller being configured to generate a control signal in response to an operation input in the first operation input surface based on capacitance change of the plurality of first capacitive elements and capacitance change of the plurality of second capacitive elements.

According to an embodiment of the present technology, there is provided an electronic apparatus including a first sensor, a second sensor, a display unit, and a controller.

The first sensor includes a first electrode board including a plurality of first capacitive elements arranged in a matrix, a first conductor layer facing the first electrode board, and a first support layer arranged between the first electrode board and the first conductor layer, the first support layer being deformable, at least one of the first electrode board and the first conductor layer being flexible.

The second sensor is layered on the first sensor, the second sensor including a second electrode board including a plurality of second capacitive elements, a second conductor layer facing the second electrode board, and a second support layer arranged between the second electrode board and the second conductor layer, the second support layer being deformable, at least one of the second electrode board and the second conductor layer being flexible.

The display unit includes an operation input surface, the display unit being provided on the first sensor.

The controller electrically connects with the first electrode board and the second electrode board, the controller being configured to generate a control signal in response to an operation input in the first operation input surface based on capacitance change of the plurality of first capacitive elements and capacitance change of the plurality of second capacitive elements.

As described above, according to the present technology, it is possible to detect input operations with a higher degree of accuracy.

Note that the present technology may not only have the above-mentioned effects but also any effect described in the disclosure.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIGS. 16A and 16B are plan views each showing a main part of electrode wires of the input device according to another structural example, in which FIG. 16A shows the structure of electrodes of a first electrode board, and FIG. 16B shows the structure of electrodes of a second electrode board;

DETAILED DESCRIPTION

Hereinafter, embodiments of the present disclosure will be described with reference to the drawings.

First Embodiment

Figure 1:
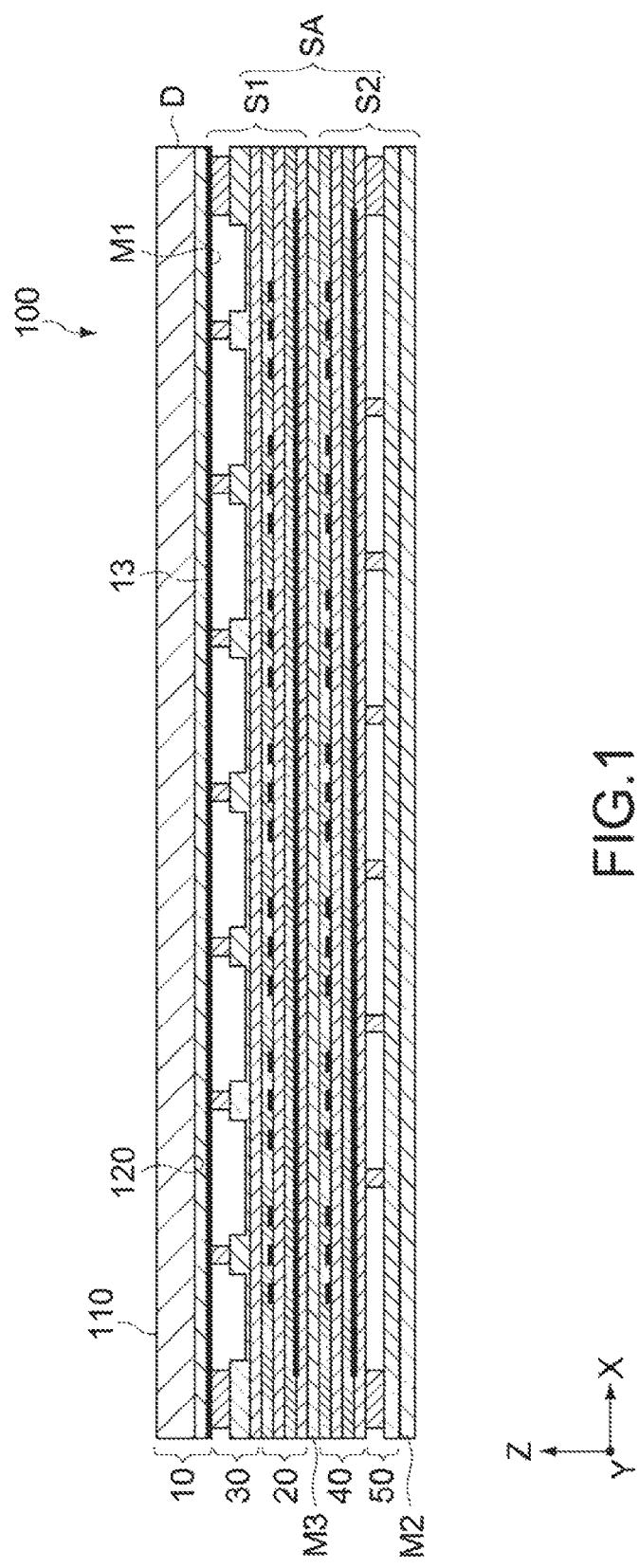
FIG. 1 is cross-sectional view schematically showing an input device according to a first embodiment of the present technology.
Figure 2:
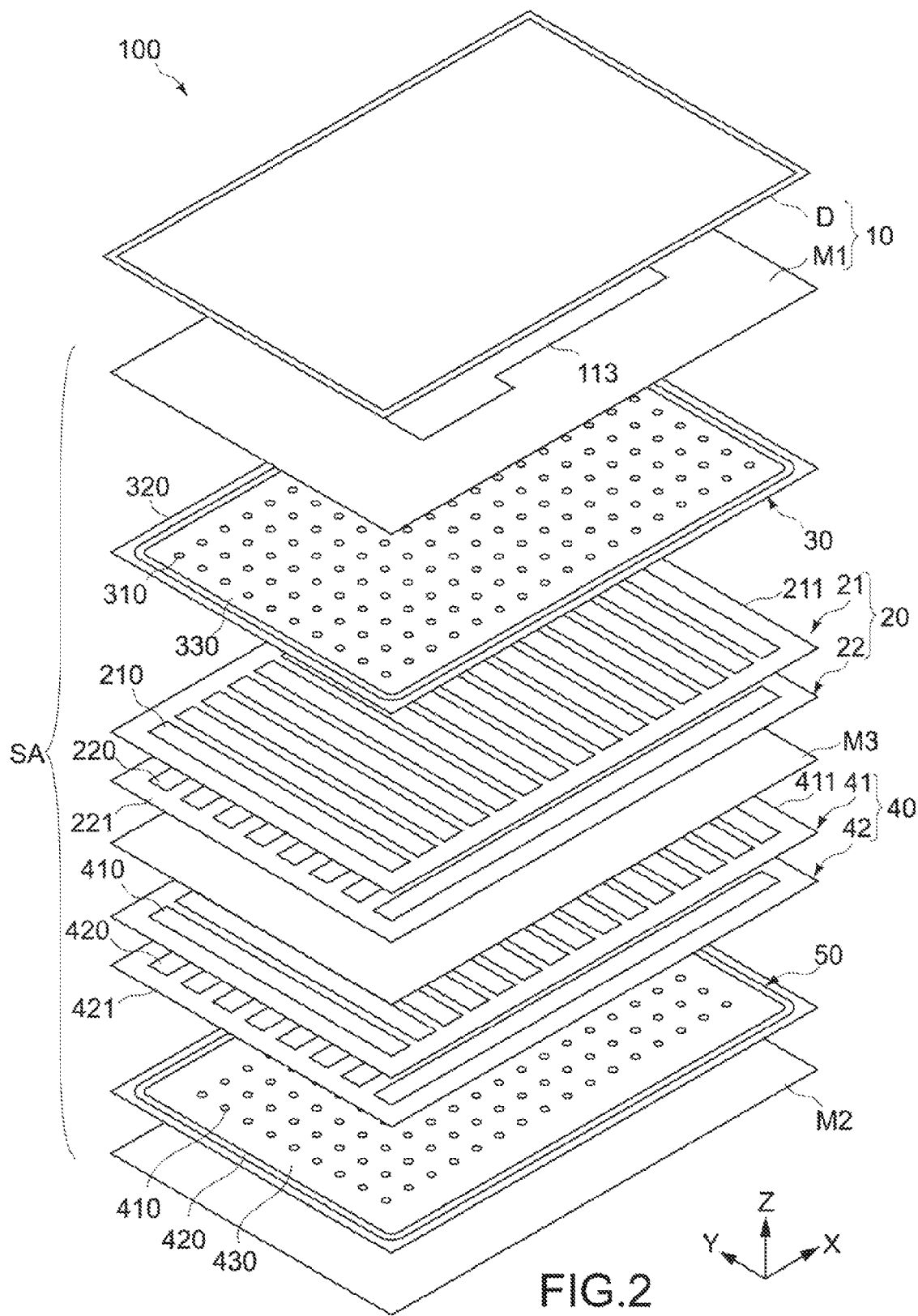
FIG. 2 is an exploded perspective view showing the input device.
Figure 3:
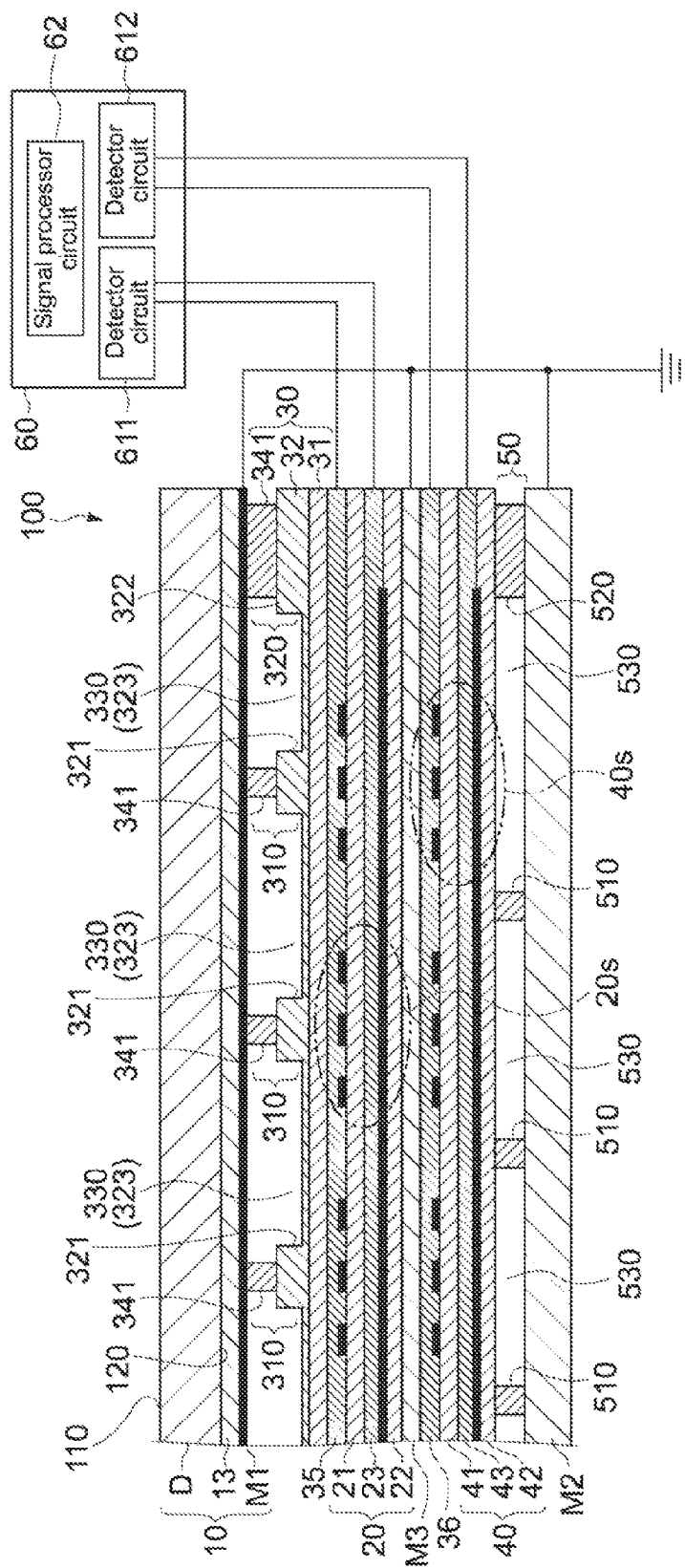
FIG. 3 is a cross-sectional view schematically showing the main part of the input device.
Figure 4:
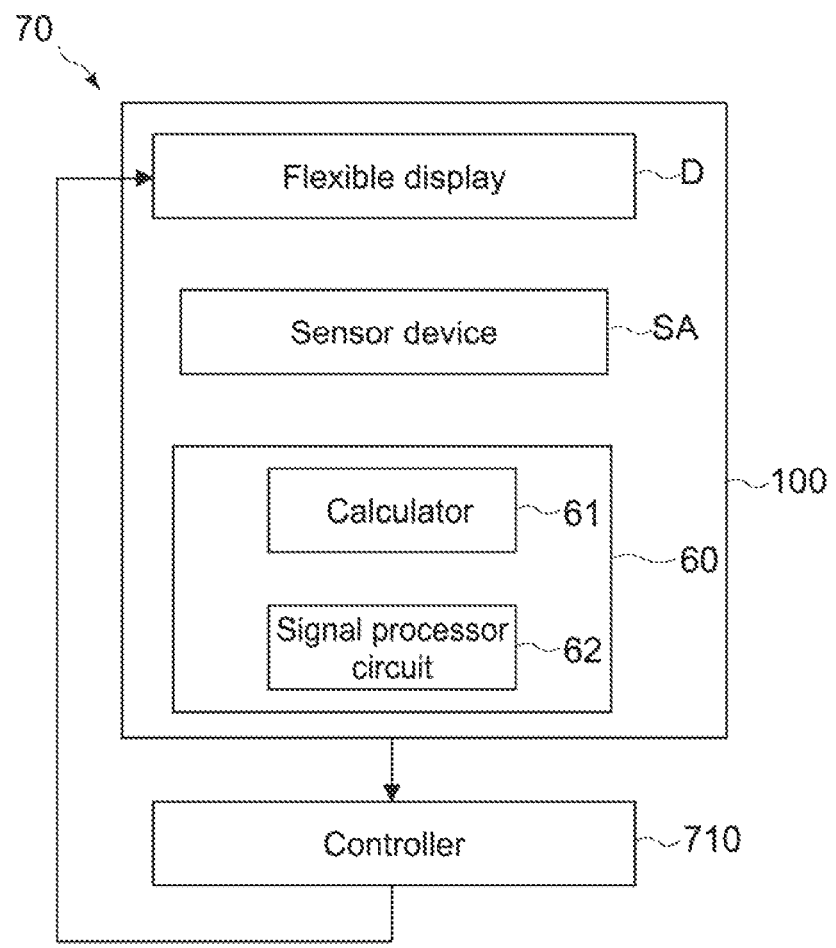
FIG. 4 is a block diagram showing an electronic apparatus including the input device.

FIG. 1 is a cross-sectional view schematically showing an input device 100 according to a first embodiment of the present technology. FIG. 2 is an exploded perspective view showing the input device 100. FIG. 3 is a cross-sectional view schematically showing the main part of the input device 100. FIG. 4 is a block diagram showing an electronic apparatus 70 including the input device 100. Hereinafter, the structure of the input device 100 of this embodiment will be described. Note that, in the drawings, the X axis and the Y axis show directions orthogonal to each other (directions on the surface of the input device 100), and the Z axis shows the direction orthogonal to the X axis and the Y axis (thickness direction of the input device 100, or vertical direction).

[Input Device]

The input device 100 includes an operated member 10, a sensor device SA, and a controller 60. The operated member 10 receives operation by a user. The sensor device SA is configured to detect operations by a user. The controller 60 is configured to generate predetermined control signals based on output from the sensor device SA.

The input device 100 of this embodiment includes a flexible display (display device) D as the operated member 10. The planer shape of the flexible display (display device) D is approximately rectangular. The input device 100 is structured as for example a flexible touchscreen display, and built in the electronic apparatus 70 (described later). Each of the sensor device SA and the operated member 10 (flexible display D) is a plate extending in the directions orthogonal to the Z axis.

The flexible display D includes an operation input surface 110, and a back surface 120 behind the operation input surface 110. The flexible display D has both the function of an operation input unit of the input device 100 and the function of a display unit. That is, the flexible display D causes the operation input surface 110 to function as an operation input surface and a display surface, and displays an image in the upper Z-axis direction in response to an operation input in the operation input surface 110 by a user. The operation input surface 110 displays for example an image corresponding to a keyboard, GUIs (Graphical User Interfaces), and the like. The flexible display D is operated with an operating member such as for example a finger of a user or a pen (stylus pen).

The specific structure of the flexible display D is not specifically limited. For example, the flexible display D may be a so-called electronic paper, an organic EL (electroluminescence) panel, an inorganic EL panel, a liquid crystal panel, or the like. Further, the thickness of the flexible display D is not specifically limited, and is for example about 0.1 mm to 1 mm.

Note that, in this embodiment, the flexible display D is independent of the sensor device SA. Alternatively, the sensor device SA may include the flexible display D.

[Sensor Device]

The sensor device SA includes a first sensor S1 and a second sensor S2.

The first sensor S1 includes a first electrode board 20, a first conductor layer M1, and a first support layer 30. In the first electrode board 20, the plurality of first detectors 20s (first capacitive elements) are arranged in a matrix. The first conductor layer M1 faces the first electrode board 20. The first support layer 30 is deformable and is arranged between the first electrode board 20 and the first conductor layer M1. At least one of the first electrode board 20 and the first conductor layer M1 is flexible. In this embodiment, both the first electrode board 20 and the first conductor layer M1 are flexible.

The second sensor S2 includes a second electrode board 40, a second conductor layer M2, and a second support layer 50. In the second electrode board 40, a plurality of second detectors 40s (second capacitive element) are arranged. The second conductor layer M2 faces the second electrode board 40. The second support layer 50 is deformable and is arranged between the second electrode board 40 and the second conductor layer M2. At least one of the second electrode board 40 and the second conductor layer M2 is flexible. In this embodiment, the second electrode board 40 is flexible, and the second conductor layer M2 has relatively high rigidity.

In this embodiment, the flexible display D is arranged on the first conductor layer M1 of the first sensor S1. The operation input surface 110 is provided on the first conductor layer M1 side. The first electrode board 20 is layered above the second electrode board 40.

The sensor device SA further includes a third conductor layer M3. The third conductor layer M3 is arranged between the first sensor S1 and the second sensor S2. In this embodiment, the third conductor layer M3 is arranged between the first electrode board 20 and the second electrode board 40.

Each of the first and third conductor layers M1 and M3 is a sheet deformable in response to deformation of the flexible display D, and is a metal foil or a mesh member made of for example Cu (copper), Al (aluminum), stainless steel (SUS), or the like. Further, each of the first and third conductor layers M1 and M3 may be a vapor-deposited film, a sputtered film, or the like made of a conductive material and formed on a sheet-type base material. Alternatively, each of the first and third conductor layers M1 and M3 may be a coated film made of a conductive paste or the like. As long as each of the first and third conductor layers M1 and M3 functions as a conductive layer, it may be made of an oxide conductive material such as ITO (indium tin oxide) or an organic conductive material such as carbon nanotube. The thickness of each of the first and third conductor layers M1 and M3 may not be specifically limited, and is for example several tens of nm to several tens of μm. Each of the first and third conductor layers M1 and M3 connects with a predetermined reference potential (for example ground potential). Further, a nonconductive film may be formed on the front surface of the metal film 12. For example, a damage-proof hard coat layer, an anticorrosion antioxidant film, or the like may be formed as the nonconductive film.

The first conductor layer M1 is arranged on the back surface 120 of the flexible display D. The first conductor layer M1 may be attached directly on the back surface 120 of the flexible display D. Alternatively, the first conductor layer M1 may be attached on the back surface 120 of the flexible display D with a bond layer 13 interposed therebetween (FIG. 1). The bond layer 13 is made of an adhesive material or a sticky material. Part of the first conductor layer M1 may be attached on part of the back surface 120 of the flexible display D. Alternatively, the entire first conductor layer M1 may be attached on the entire back surface 120 of the flexible display D. Alternatively, the first conductor layer M1 may be a vapor-deposited film, a sputtered film, or the like directly formed on the flexible display D. Alternatively, the first conductor layer M1 may be a coated film made of a conductive paste or the like printed on the front surface of the flexible display D.

Similarly, the third conductor layer M3 may be directly attached between the lower surface of the first electrode board 20 and the upper surface of the second electrode board 40. Alternatively, the third conductor layer M3 may be attached on the lower surface of the first electrode board 20 with a bond layer made of an adhesive material or a sticky material interposed therebetween. The third conductor layer M3 may be attached on the upper surface of the second electrode board 40 with a bond layer made of an adhesive material or a sticky material interposed therebetween. Note that, in the example of FIG. 3, the third conductor layer M3 is directly formed on the lower surface of the first electrode board 20 (second base material 221 (described later)), and is attached on the upper surface of the second electrode board 40 with a bond layer 36 interposed therebetween.

The second conductor layer M2 is the lowermost part of the input device 100, and faces the first conductor layer M1 and the third conductor layer M3 in the Z-axis direction. The second conductor layer M2 functions as a support plate supporting the input device 100 for example. The second conductor layer M2 may be a metal plate made of for example Al (aluminum) alloy, Mg (magnesium) alloy, and other metal materials, or may be a conductor plate made of carbon fiber-reinforced plastic or the like. Alternatively, the third conductor layer M3 may be a laminate, in which a conductor film is formed on an insulation layer made of a plastic material or the like. Examples of the conductor film include a plated film, a vapor-deposited film, sputtered film, a metal foil, and the like. Further, the thickness of the third conductor layer M3 is not specifically limited, and is for example about 0.3 mm. The second conductor layer M2 connects with a predetermined reference potential (for example ground potential).

(First and Second Electrode Boards)

The first electrode board 20 includes a plurality of first electrode wires 210 and a plurality of second electrode wires 220. The plurality of second electrode wires 220 intersect with the plurality of first electrode wires 210. A plurality of first capacitive elements are formed in the areas in which the plurality of second electrode wires 220 intersect with the plurality of first electrode wires 210, respectively.

In this embodiment, the first electrode board 20 is a laminate including a first wiring board 21 and a second wiring board 22. The first wiring board 21 includes the plurality of first electrode wires 210 and a first base material 211. The second wiring board 22 includes the plurality of second electrode wires 220 and a second base material 221. The respective first electrode wires 210 extend in the Y-axis direction, and are arrayed at regular intervals on the first base material 211 in the X-axis direction. The respective second electrode wires 220 extend in the X-axis direction, and are arrayed at regular intervals on the second base material 221 in the Y-axis direction. The plurality of first electrode wires 210 face the plurality of second electrode wires 220 in the Z-axis direction, whereby a plurality of intersection areas are formed. The plurality of intersection areas function as the plurality of first detectors 20s (first capacitive elements) arranged in a matrix on a plane parallel to the XY plane (FIG. 3).

The first wiring board 21 is bonded with the second wiring board 22 with the bond layer 23 interposed therebetween. The bond layer 23 is made of an adhesive material or a sticky material. The first wiring board 21 is at the upper side of the second wiring board 22 (flexible display D side). Alternatively, the second wiring board 22 may be at the upper side of the first wiring board 21.

One of the plurality of first electrode wires 210 and the plurality of second electrode wires 220 function as driver electrodes (E11). The others function as detector electrodes (E12). The driver electrodes (E11) and the detector electrodes (E12) connect with a detector circuit (controller 60) configured to drive the first electrode board 20. The above-mentioned detector circuit applies predetermined drive signals (voltage signals) to the driver electrodes (E11) in order. The detector electrode (E12) outputs signals showing capacitance changes of the intersection areas (first detectors 20s), which capacitive-couple with the driver electrodes (E11).

The second electrode board 40 includes a plurality of third electrode wires 410 and a plurality of fourth electrode wires 420. The plurality of fourth electrode wires 420 intersect with the plurality of third electrode wires 410. A plurality of second capacitive elements are formed in the areas in which the plurality of fourth electrode wires 420 intersect with the plurality of third electrode wires 410.

In this embodiment, the second electrode board 40 is a laminate including a third wiring board 41 and a fourth wiring board 42. The third wiring board 41 includes the plurality of third electrode wires 410 and a third base material 411. The fourth wiring board 42 includes the plurality of fourth electrode wires 420 and a fourth base material 421. The respective third electrode wires 410 extend in the Y-axis direction, and are arrayed at regular intervals on the third base material 411 in the X-axis direction. The respective fourth electrode wires 420 extend in the X-axis direction, and are arrayed at regular intervals on the fourth base material 421 in the Y-axis direction. The plurality of third electrode wires 410 face the plurality of fourth electrode wires 420 in the Z-axis direction, whereby a plurality of intersection areas are formed. The plurality of intersection areas function as the plurality of second detectors 40s (first capacitive elements) arranged in a matrix on a plane parallel to the XY plane (FIG. 3).

The third wiring board 41 is bonded with the fourth wiring board 42 with the bond layer 43 interposed therebetween. The bond layer 43 is made of an adhesive material or a sticky material. The third wiring board 41 is at the upper side of the fourth wiring board 42 (flexible display D side). Alternatively, the fourth wiring board 42 may be at the upper side of the third wiring board 41.

One of the plurality of third electrode wires 410 and the plurality of fourth electrode wires 420 function as driver electrodes (E21). The others function as detector electrodes (E22). The driver electrodes (E21) and the detector electrodes (E22) connect with a detector circuit (controller 60) configured to drive the second electrode board 40. The above-mentioned detector circuit applies predetermined drive signals (voltage signals) to the driver electrodes (E21) in order. The detector electrode (E22) outputs signals showing capacitance changes of the intersection areas (second detectors 40s), which capacitive-couple with the driver electrodes (E21).

In this embodiment, the plurality of first detectors 20s face the plurality of second detectors 40s in the layered direction (Z-axis direction), respectively. Alternatively, the detectors 20s may not face the detectors 40s in the Z-axis direction.

Each of the first to fourth base materials 211, 221, 411, and 421 is for example a flexible sheet material, and is specifically an electric-insulation plastic sheet (film) or the like made of PET, PEN, PC, PMMA, polyimide, or the like. The thickness of the first base material 211 is not specifically limited, and is for example several tens of μm to several hundreds of μm.

Each of the first and third electrode wires 210 and 410 may be a single electrode wire or may include a plurality of electrodes arrayed in the X-axis direction. Similarly, each of the second and fourth electrode wires 220 and 420 may be a single electrode wire or may include a plurality of electrodes arrayed in the Y-axis direction.

In a mutual-capacitance-type (capacitance-reduction-type) device, the first, second, and third conductor layers absorb electric fields leaking from the ends of the electrode wires. Capacitance change is determined based on the amounts of the absorbed electric fields. Because of this, if the electrode wire includes a plurality of sub-electrode wires, the capacitance change may be increased. Further, the higher the ratio of the area of gaps between the sub-electrodes to the area of the sub-electrodes, the higher the capacitance change ratio (capacitance change resulting from deformation/capacitance before deformation). In view of this, it is desirable that the width of each sub-electrode be narrower and the number of the sub-electrodes be larger.

Figure 5:
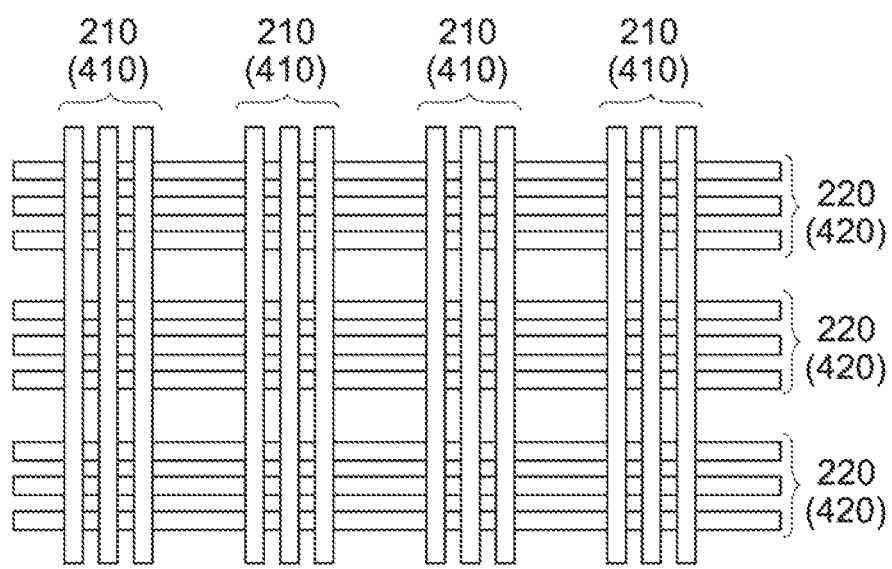
FIG. 5 is a plan view showing the main part of the electrode wires of the input device according to a structural example.

In this embodiment, as shown in FIG. 5, each of the plurality of first and third electrode wires 210 and 410 is formed by an electrode wire group (sub-electrodes) including a plurality of electrode wires. Each of the plurality of second and fourth electrode wires 220 and 420 is formed by an electrode wire group (sub-electrodes) including a plurality of electrode wires. Note that the width of each sub-electrode of the plurality of first electrode wires may be different from the width of each sub-electrode of the plurality of second electrode wires. The width of each sub-electrode of the plurality of third electrode wires may be different from the width of each sub-electrode of the plurality of fourth electrode wires. Further, at least ones of the plurality of first electrode wires and the plurality of second electrode wires may be a single electrode wire. At least ones of the plurality of third electrode wires and the plurality of fourth electrode wires may be a single electrode wire.

Figure 25A:
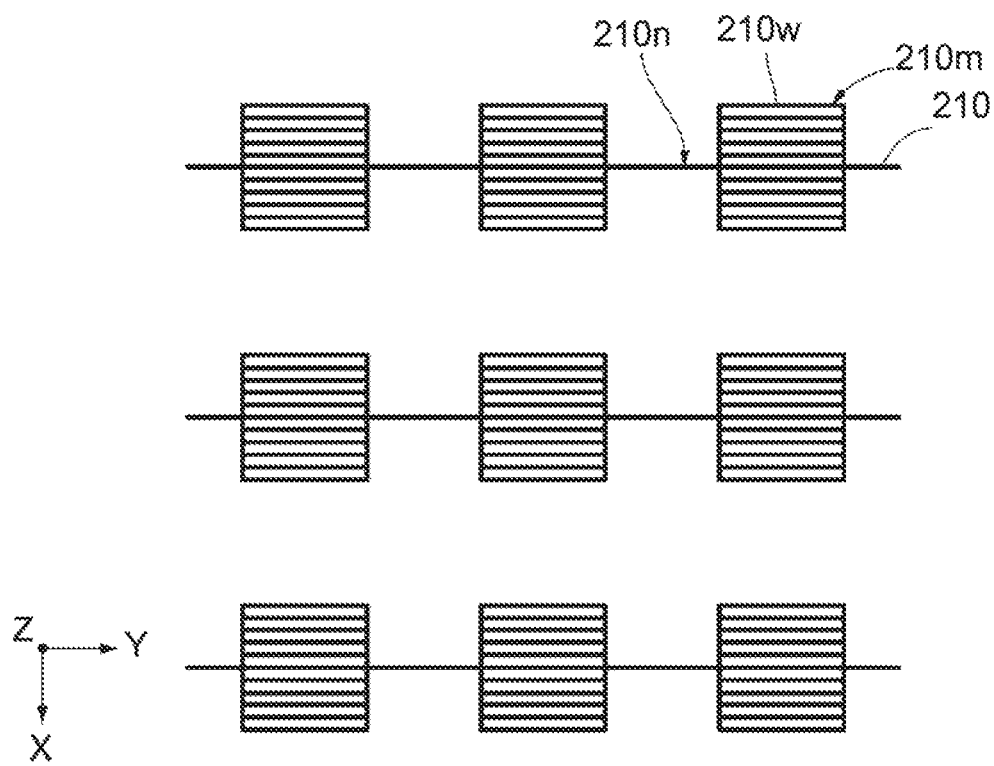
FIGS. 25A and 25B are plan views each showing a main part of electrode wires of the input device according to a modification example.
Figure 25B:
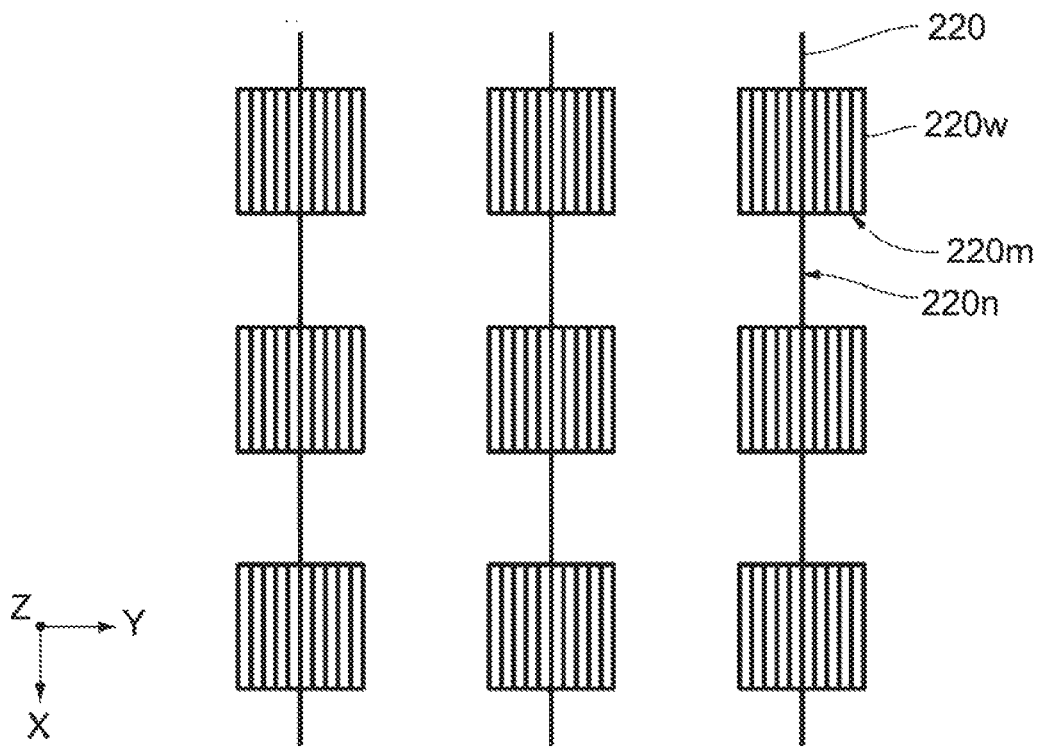

Further, as described later, each intersection area of each of the first to fourth electrode wires 210, 220, 410, and 420 may include a plurality of parallel electrode wires (sub-electrodes) (FIGS. 25A and 25B).

(First and Second Support Layers)

The first support layer 30 is arranged between the first electrode board 20 and the first conductor layer M1, and is elastically deformable. In this embodiment, the first support layer 30 includes a plurality of first columns 310, a first frame 320, and a first space 330. The first support layer 30 is bonded on the first electrode board 20 with a bond layer 35 (FIG. 3) interposed therebetween. The bond layer 35 is made of a sticky material or an adhesive material.

The plurality of first columns 310 are structured to make a space between the first electrode board 20 and the first conductor layer M1 in the Z-axis direction. The heights of the plurality of first columns 310 are substantially the same. The first frame 320 extends along the rim of the first electrode board 20, and surrounds the plurality of first columns 310. The first space 330 is around the plurality of first columns 310. The first frame may form the airtight first space 330. Alternatively, the first space 330 may be in communication with the outside of the input device 100 through an air hole (not shown) formed through the first frame 320.

Next, the layer structure of the first support layer 30 including the first columns 310, the first frame 320, and the first space 330 will be described.

As shown in FIG. 3, the first support layer 30 of this embodiment has a layer structure including a base material 31, a structural layer 32, and a plurality of bonds 341. The structural layer 32 is provided on the front surface (upper surface) of the base material 31. The plurality of bonds 341 are formed on predetermined positions on the structural layer 32.

The base material 31 is an electric-insulated plastic sheet made of PET, PEN, PC, or the like. The thickness of the base material 31 is not specifically limited, and is for example several μm to several hundreds of μm.

The structural layer 32 is formed of an electric-insulated resin material such as UV curable resin. The structural layer 32 on the base material 31 includes a plurality of first protrusions 321, a second protrusion 322, and a concave 323. Each first protrusion 321 is for example, a column, a prism, a truncated pyramid, or the like protruding in the Z-axis direction. The first protrusions 321 are arrayed on the base material 31 at predetermined intervals. The second protrusion 322 has a predetermined width and surrounds the rim of the base material 31.

Further, the structural layer 32 is made of a material having moderate rigidity so that the first electrode board 20 may be deformed in response to an operation input in the operation input surface 110. Alternatively, the structural layer 32 may be made of an elastic material so that the structural layer 32 may be deformed together with the operated member 10 (flexible display D) during an input operation. That is, the elastic modulus of the structural layer 32 is not specifically limited, and may be arbitrarily selected as long as desired operation feeling and desired detection sensitivity are achieved.

The concave 323 is a flat surface around the first and second protrusions 321 and 322. That is, the space zone above the concave 323 is the first space 330.

The plurality of bonds 341 are provided on the first and second protrusions 321 and 322, respectively, and are made of an adhesive resin material or the like. That is, each first columns 310 is a laminate including the first protrusion 321 and the bond 341 formed thereon. The first frame 320 is a laminate including the second protrusion 322 and the bonds 341 formed thereon. The thicknesses (heights) of the first columns 310 and the first frame 320 are approximately the same, and are for example several μm to several hundreds of μm in this embodiment.

Seen in the layered direction (Z-axis direction), the plurality of first columns 310 face the centers of the plurality of first detectors 20*s*, respectively. Note that, alternatively, the plurality of first columns 310 may be displaced from the centers of the plurality of first detectors 20*s*, respectively (FIG. 9) (described later).

Meanwhile, the second support layer 50 is arranged between the second electrode board 40 and the second conductor layer M2. The second support layer 50 includes a plurality of second columns 510, a second frame 520, and a second space 530.

The plurality of second columns 510 are structured to make a space between the second electrode board 40 and the second conductor layer M2 in the Z-axis direction. The heights of the plurality of second columns 510 are substantially the same. The second frame 520 extends along the rim of the second electrode board 40, and surrounds the plurality of second columns 510. The second space 530 is around the plurality of second columns 510. The second frame may form the airtight second space 530. Alternatively, the second space 530 in communication with the outside of the input device 100 through an air hole (not shown) formed through the second frame 520.

As shown in FIG. 3, according to this embodiment, the second columns 510 and the second frame 520 of the second support layer 50 are directly formed on the second conductor layer M2. The second columns 510 and the second frame 520 are made of for example an adhesive insulated resin material, and function as bonds for bonding the second conductor layer M2 and the second electrode board 40. The thicknesses of the second columns 510 and the second frame 520 are not specifically limited, and are for example several μm to several hundreds of μm.

Seen in the layered direction (Z-axis direction), the plurality of second columns 510 and the first columns 310 are arranged in a staggered manner. That is, the plurality of second columns 510 are displaced from the centers of the plurality of second detectors 40*s*, respectively. Note that, alternatively, the plurality of second columns 510 may face the centers of the plurality of second detectors 40*s*, respectively.

The plurality of second columns 510 deformably support the second electrode board 40. Each second column 510 is for example, a column, a prism, a truncated pyramid, or the like protruding in the Z-axis direction. The second columns 510 are arrayed on the second conductor layer M2 at predetermined intervals. Similar to the structural layer 32 structuring the first columns 310, the elastic modulus of the plurality of second columns 510 is not specifically limited, and may be arbitrarily selected as long as desired operation feeling and desired detection sensitivity are achieved. The plurality of second columns 510 may be made of an elastic material so that the plurality of second columns 510 may be deformed together with the second electrode board 40 during an input operation.

(Controller)

The controller 60 electrically connects with the first electrode board 20 and the second electrode board 40. More specifically, the controller 60 connects with the plurality of first to fourth electrode wires 210, 220, 410, and 420. The controller 60 includes detector circuits and a signal processor circuit. When drive signals are applied to electrode wires corresponding to the driver electrodes (E11, E21) out of the above-mentioned electrode wires at predetermined intervals, the above-mentioned detector circuits obtain output from the electrode wires corresponding to the detector electrodes (E12, E22). Based on the output, the above-mentioned detector circuits obtain the capacitance change amounts of the detectors 20s and 40s. Based on the capacitance change amounts of the detectors 20s and 40s, the above-mentioned signal processor circuit generates information (control signal) on an operation input in the operation input surface 110.

In this embodiment, the controller 60 is a single device or component. That is, the controller 60 may be a chip such as an IC, or may be a module including a plurality of circuit components. The controller 60 may be mounted on the input device 100, or may be mounted on the electronic apparatus 70, in which the input device 100 is embedded in.

As shown in FIG. 3, the controller 60 of this embodiment includes a first detector circuit 611, a second detector circuit 612, and a signal processor circuit 62. Typically, the controller 60 is a computer including a CPU/MPU, a memory, and the like.

The first detector circuit 611 electrically connects with the first electrode board 20. The second detector circuit 612 electrically connects with the second electrode board 40. Each of the first and second detector circuits 611 and 612 includes a signal generator, a calculator, and the like. The signal generator is configured to generate the above-mentioned drive signal. The calculator is configured to calculate capacitance change amounts of the detectors 20s and 40s.

The signal processor circuit 62 is configured to generate information (control signal) on an operation input in the operation input surface 110 based on output from the first and second detector circuits 611 and 612, and to output the signal, i.e., an operation signal, to a controller 710 (FIG. 4) of the electronic apparatus 70.

In this embodiment, the controller 60 is configured to detect capacitance changes of the first detectors 20s and the second detectors 40s. Alternatively, a controller (first controller device) may be configured to detect capacitance changes of the detectors 20s, and a controller (second controller device) may be configured to detect capacitance changes of the detectors 40s (FIG. 15) (described later).

The electronic apparatus 70 of FIG. 4 includes the input device 100 and the controller 710. The controller 710 is configured to execute process in response to an operation signal output from the controller 60. The operation signal processed by the controller 710 is output to the flexible display D as an image signal, for example. The flexible display D connects with the controller 710 via a flexible wiring board 113 (see FIG. 2).

Examples of the electronic apparatus 70 include, typically, a mobile phone, a smartphone, a laptop PC (personal computer), a tablet PC, a mobile game machine, and the like. The electronic apparatus 70 may not be such a mobile electronic apparatus but may be a stationary electronic apparatus or the like such as an ATM (automatic teller machine) or an automatic ticket vending machine.

[Behavior of Input Device]

Next, typical behaviors of the input device 100 (sensor device SA) of this embodiment will be described.

Figure 6:
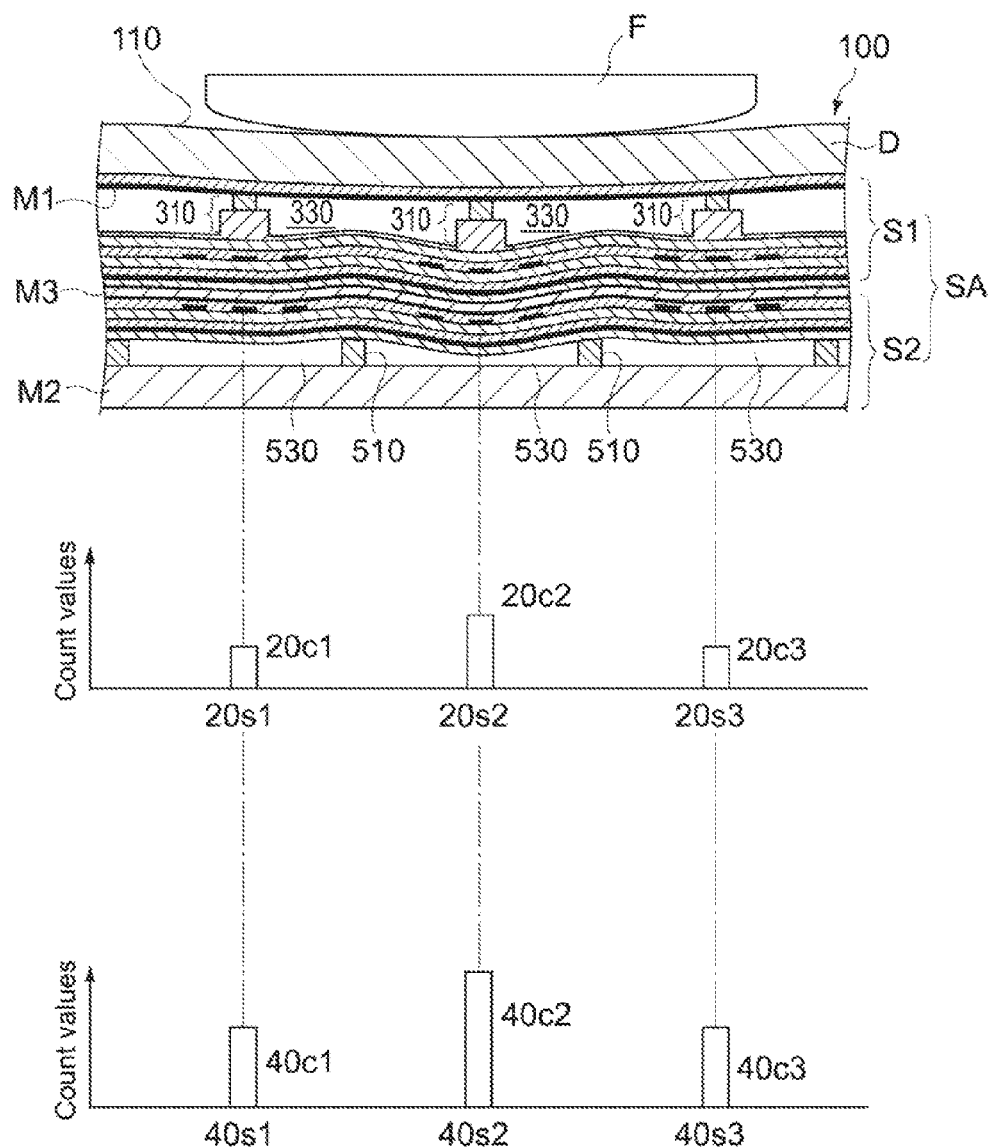
FIG. 6 includes a cross-sectional view showing the main part of the input device and illustrating a behavior of the input device, and a diagram showing examples of output.

FIG. 6 is a cross-sectional view showing the main part of the input device 100 and illustrating a behavior of the input device 100 when an operation is input with a finger F.

When the finger F presses the operation input surface 110, the first conductor layer M1 comes close to the first electrode board 20 while the first columns 310 immediately below the finger F is elastically deformed. As a result, electrostatic capacitances of the first detectors $20s1$, $20s2$, and $20s3$ of the first sensor S1 in the vicinity of the pressed position change depending on the distances from the first conductor layer M1, respectively. The first detector circuit 611 detects count values $20c1$, $20c2$, and $20c3$ depending on the change amounts, respectively. In the example shown in FIG. 6, the detector $20s2$ is immediately below the pressed position, and thus shows the largest capacitance change amount.

Meanwhile, the pressing force input in the operation input surface 110 is transmitted to the first electrode board 20, the third conductor layer M3, and the second electrode board 40 via the first columns 310. As a result, the first electrode board 20, the third conductor layer M3, and the second electrode board 40 are deformed together. As a result, electrostatic capacitances of the second detectors $40s1$, $40s2$, and $40s3$ of the second sensor S2 in the vicinity of the pressed position are changed depending on the distances from the second conductor layer M2, respectively. The second detector circuit 612 detects count values $40c1$, $40c2$, and $40c3$ depending on the change amounts, respectively. In the example shown in FIG. 6, the detector $40s2$ is immediately below the pressed position, and thus shows the largest capacitance change amount.

The controller 60 determines the position (input position) on the operation input surface 110 pressed with the finger F and the pressing force based on output from the first detector circuit 611 and the second detector circuit 612. In this embodiment, the first detectors 20s face the second detectors 40s in the thickness direction (Z-axis direction), respectively. Because of this, typically, it is determined that the pressed position (input position) is in the vicinity of the XY coordinates of the detectors $20s2$ and $40s2$ having the highest count values. The pressing force is determined based on the capacitance change amounts of the detectors $20s2$ and $40s2$ and the like.

In the example of FIG. 6, the detector $20s2$ has the largest count value. The detectors $20s1$ and $20s3$ have approximately the same count values, which are smaller than the count value of the detector $20s2$. In this case, a calculator 61 calculates the center of gravity and the like based on the ratio of the count values of the detectors $20s1$, $20s2$, and $20s3$. The calculator 61 is capable of calculating the XY coordinate of the operation position in the vicinity of the detector $20s2$. Further, in the example of FIG. 6, the detector $40s2$ has the largest count value. The detectors $40s1$ and $40s3$ have approximately the same count values, which are smaller than the count value of the detector $40s2$. In this case, the calculator 61 calculates the center of gravity and the like based on the ratio of the count values of the detectors $40s1$, $40s2$, and $40s3$. The calculator 61 is capable of calculating the XY coordinate of the operation position in the vicinity of the detector $40s2$. The XY coordinate calculated based on the capacitance changes of the detectors 20s is independent of the XY coordinate calculated based on the capacitance changes of the detectors 40s.

In this embodiment, the pressed position and the pressing force are determined based on the output from the detector 20s2 of the first sensor S1 in the vicinity of the operation input surface. In this case, the controller 60 sets a predetermined touch threshold for a count value of each detector 20s. For example, if the count value 20c2 of the detector 20s2 exceeds the above-mentioned touch threshold, the controller 60 determines that the touch operation (input operation) is ON.

The controller 60 generates an operation signal showing the pressed position and the pressing force, and outputs the operation signal to the controller 710 of the electronic apparatus 70. In response to the operation signal, the controller 710 controls an image displayed on the flexible display D, or controls a displayed image depending on the change of the pressed position.

Figure 7:
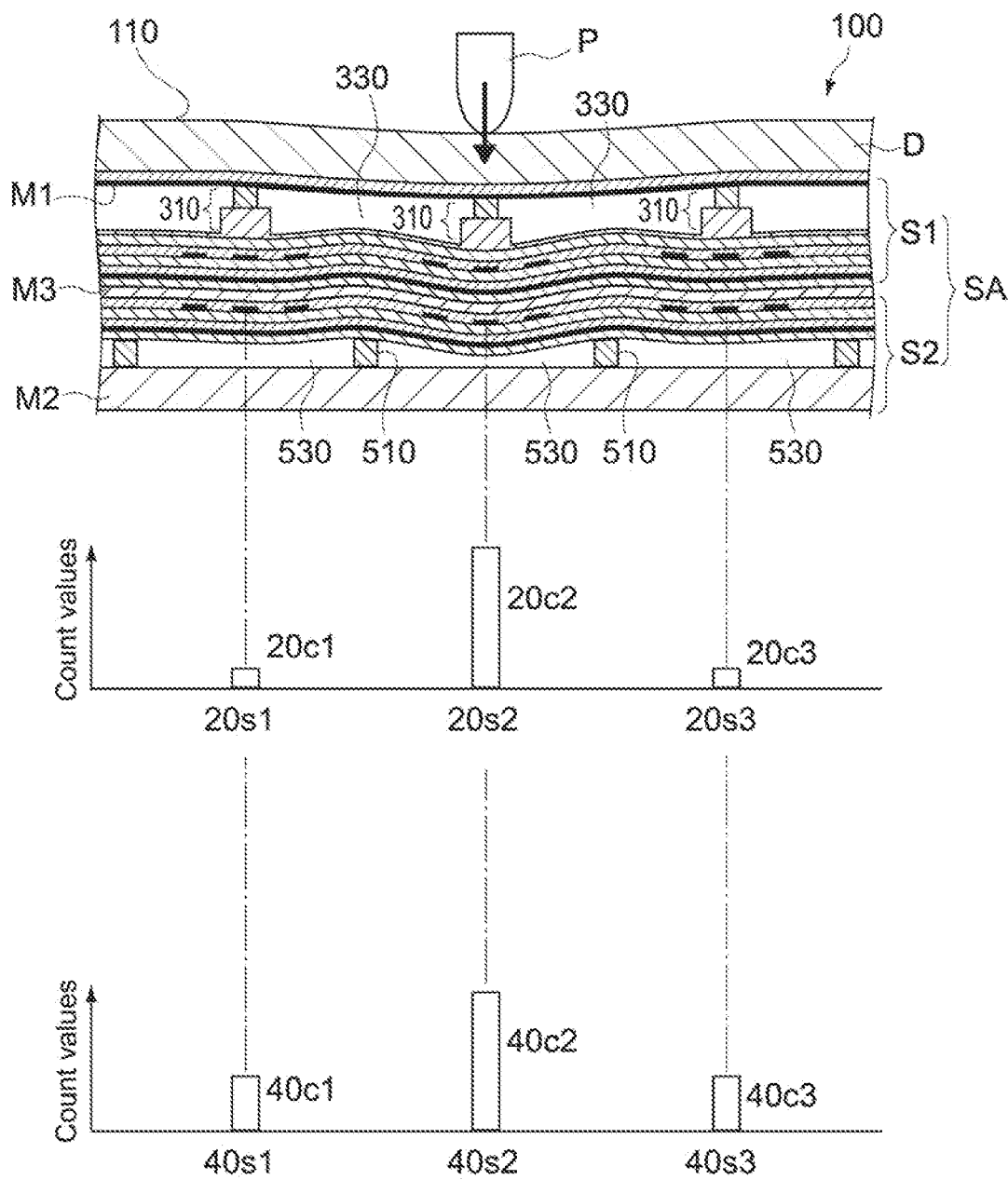
FIG. 7 includes a cross-sectional view showing the main part of the input device and illustrating a behavior of the input device, and a diagram showing examples of output.

Next, FIG. 7 is a cross-sectional view showing the main part of the input device 100 and illustrating a behavior of the input device 100 when an operation is input with a pen P. The input device 100 behaves similar to the above description in response to an operation input with the pen P.

That is, electrostatic capacitances of the first detectors 20s1, 20s2, and 20s3 of the first sensor S1 in the vicinity of the pressed position change depending on the distances from the first conductor layer M1, respectively. The first detector circuit 611 detects count values 20c1, 20c2, and 20c3 depending on the change amounts, respectively. In this case, also, the detector 20s2 is immediately below the pressed position, and thus shows the largest capacitance change amount. Electrostatic capacitances of the second detectors 40s1, 40s2, and 40s3 of the second sensor S2 in the vicinity of the pressed position are changed depending on the distances from the second conductor layer M2, respectively. The second detector circuit 612 detects count values 40c1, 40c2, and 40c3 depending on the change amounts, respectively. In this case, also, the detector 40s2 is immediately below the pressed position, and thus shows the largest capacitance change amount. Similar to the above description, the controller 60 determines the position (input position) on the operation input surface 110 pressed with the pen P and the pressing force. In addition, similar to the above description, the controller 710 controls an image displayed on the flexible display D.

In this embodiment, the first detectors 20s face the second detectors 40s in the thickness direction (Z-axis direction), respectively. Alternatively, the first detectors 20s are displaced from the second detectors 40s (described later). Further, in this embodiment, the first detectors 20s and the second detectors 40s are arranged at the same intervals. Alternatively, the first detectors 20s and the second detectors 40s may be arranged at the different intervals. For example, the number of the second detectors 40s may be smaller than the number of the first detectors 20s. In this case, also, the first sensor S1 independently outputs a signal showing the coordinate (XY coordinate) of a pressed position and a pressing force (Z coordinate), and the second sensor S2 independently outputs a signal showing the coordinate (XY coordinate) of a pressed position and a pressing force (Z coordinate).

As described above, according to the input device 100 of this embodiment, the first sensor S1 independently outputs a signal showing the coordinate (XY coordinate) of a pressed position and a pressing force (Z coordinate). The second sensor S2 independently outputs a signal showing the coordinate (XY coordinate) of a pressed position and a pressing force (Z coordinate). An image displayed on the flexible display D is controlled based on the output from the first sensor S1 and the output from the second sensor S2.

That is, according to the input device 100 of this embodiment, the relative distances between the first detectors 20s and the first conductor layer M1 are variable depending on pressing force. The relative distances between the second detectors 40s and the second conductor layer M2 are variable depending on pressing force. As a result, it is possible to detect a pressed position and a pressing force by using the two sensors, i.e., the first sensor S1 and the second sensor S2. As a result, detection sensitivity of an input operation may be increased, or reliability of a detection behavior may be increased. As a result, it is possible to input an operation flexibly with an arbitrary gesture operation by moving fingers and the like. In addition, it is possible to detect the input operation stably with a high degree of accuracy.

Further, in this embodiment, the third conductor layer M3 is arranged between the first sensor S1 and the second sensor S2. With this structure, it is possible to prevent electromagnetic interference from occurring between the first and second detectors 20s and 40s. As a result, each of the first sensor S1 and the second sensor S2 is capable of outputting a signal showing capacitance changes in response to an input operation with a high degree of accuracy.

Further, according to this embodiment, it is possible to detect an input operation with a finger and an input operation with a pen distinctively.

For example, the contact area of a finger is larger than the contact area of a pen. Because of this, if the same load (pressing force) is applied with them, the pressure to the pressing force with a finger is smaller than the pressure to the same pressing force with a pen. As a result, the difference between the capacitance change amount of the detector 20s2 of the first sensor S1 immediately below the pressed position and the capacitance change amounts of the detectors 20s1 and 20s3 next to the detector 20s2 when an operation is input with a pen may be larger than the difference when an operation is input with a finger (see count value of detector 20s2 of FIG. 6 and FIG. 7). That is, a local distribution of capacitance change amounts may be obtained.

In view of this, the first sensor S1 is configured to function as a sensor-for-pen, and the second sensor S2 is configured to function as a sensor-for-finger. In addition, a predetermined threshold for an operation with a pen is set as a count value of each of the plurality of first detectors 20s of the first sensor S1. As a result, when the count value of a detector (detector 20s2 immediately below pressed position) having the largest capacitance change out of the count values of the plurality of first detectors 20s exceeds the above-mentioned threshold for an operation with a pen, it is determined that an operation is input with a pen. The value of the above-mentioned threshold for an operation with a pen is not specifically limited. Preferably, the threshold for an operation with a pen is larger than the count value of the detector 40s2 immediately below the pressed position, which is output when an operation is normally input with a finger.

As described above, the first sensor S1 is configured to function as a sensor-for-pen. As a result, it is possible to automatically change an input mode based on a normal input operation with a finger or a pen without a special operation necessary to change an input mode.

In order to distinguish between an operation input with a finger and an operation input with a pen with a high degree of accuracy, the design of the sensor-for-finger (the second sensor S2) may be different from the design of the sensor-for-pen (first sensor S1). For example, because pressure with a finger is smaller than pressure with a pen, sensitivity of the sensor-for-finger may be higher than sensitivity of the sensor-for-pen.

In order that sensitivity of the sensor-for-finger may be higher than sensitivity of the sensor-for-pen, for example the following structures may be adopted.

(1) The height of the support layer (second support layer 50) of the sensor-for-finger is smaller than the height of the support layer (first support layer 30) of the sensor-for-pen.

(2) The number of the columns (first columns 310) of the support layer of the sensor-for-pen is smaller than the number of the columns (second columns 510) of the support layer of the sensor-for-finger.

(3) The threshold for determining that the sensor-for-pen is touched (input operation) is higher than the threshold for determining that the sensor-for-finger is touched.

For example according to the above-mentioned items (1) to (3), the capacitance change of each detector (second detector 40s) of the sensor-for-finger when an operation is input in the operation input surface 110 may be larger than the capacitance change of each detector (first detector 20s) of the sensor-for-pen.

In order that the local distribution of the capacitance change amounts of the sensor-for-pen is narrower than the distribution of the capacitance change amounts of the sensor-for-finger, for example the following structures may be adopted.

(4) The distance between the sensor-for-pen and the operation input surface is smaller than the distance between the sensor-for-finger and the operation input surface.

(5) The number of the columns (first columns 310) of the support layer of the sensor-for-pen is larger than the number of the columns (second columns 510) of the support layer of the sensor-for-finger.

(6) A column/plurality of columns (first column(s) 310) of the support layer of the sensor-for-pen is/are arranged on the position facing each detector (first detector 20s) of the sensor-for-pen.

In FIG. 6 and FIG. 7, when an operation is input, the first column 310 (first column above detector 20s2 of FIG. 6) is compressed, whereby the distance between the detector 20s2 and the first conductor layer M1 is changed. As a result, the capacitance change of the detector 20s2 is generated. Further, in FIG. 6 and FIG. 7, the first columns 310 bend the electrode board, whereby the second space 530 around the second columns 510 is compressed. As a result, the distance between the detectors 40s2 and the conductor layer M2 is changed, whereby the capacitance change of the detectors 40s2 is generated. In general, the former (deformation resulting from compression of columns) requires a higher pressure than the latter (deformation resulting from bend of electrode board). In view of this, the sensor-for-pen may detect a local pressure if the columns of the sensor-for-pen are compressed and deformed, if the number of the columns of the sensor-for-pen is increased, or if the column(s) of the sensor-for-pen is/are arranged on the position facing the detector.

For example according to the above-mentioned items (4) to (6), the local distribution of the capacitance change amounts of the detectors (first detectors 20s) of the sensor-for-pen may be narrower than the local distribution of the capacitance change amounts of the detectors (second detectors 40s) of sensor-for-finger when an operation is input in the operation input surface 110.

Further, as shown in FIG. 6 and FIG. 7, the distribution of the capacitance change of the second sensor S2 (sensor-for-finger) when an operation is input with a pen is similar to the distribution of the capacitance change of the second sensor S2 (sensor-for-finger) when an operation is input with a finger. In this case, the tone resolution of the second sensor S2 (sensor-for-finger) may be increased, and a pen and a finger may be distinguished based on the difference (difference between 40s2 and 40s1, difference between 40s2 and 40s3) of distributions of capacitance change amounts. Further, the signal processor circuit 62 or the controller 710 may be configured to execute the following algorithm. That is, the first sensor S1 (sensor-for-pen) distinguishes between a pen and a finger, and determines that an operation is input with a pen when the sensor-for-pen exceeds a threshold and the sensor-for-finger exceeds a threshold.

Second Embodiment

Figure 8:
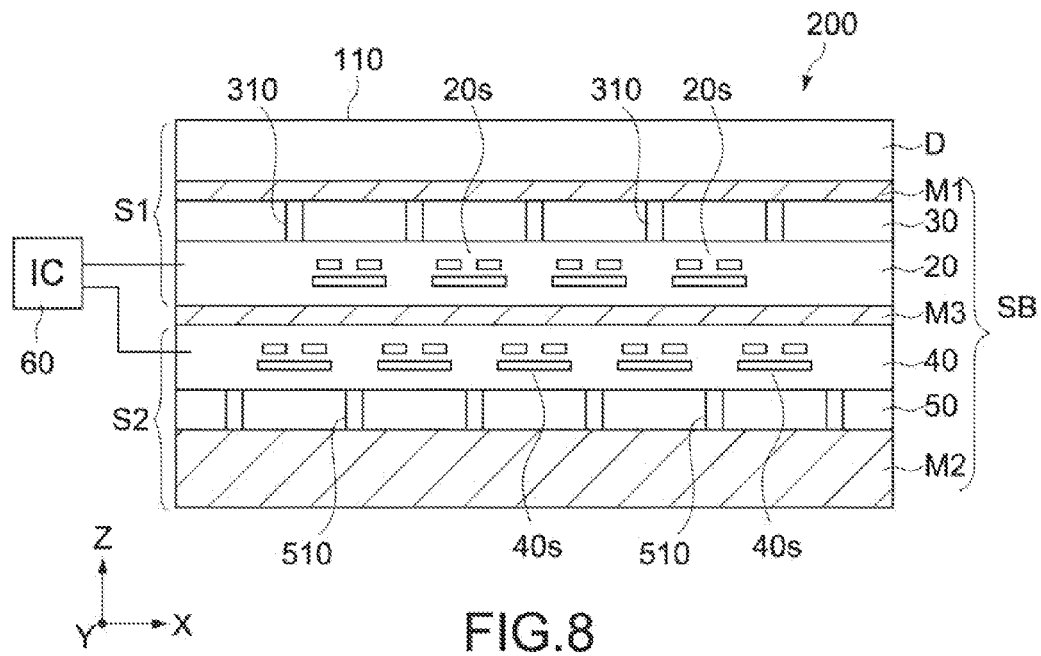
FIG. 8 is a cross-sectional view schematically showing an input device according to a second embodiment of the present technology.
Figure 9:
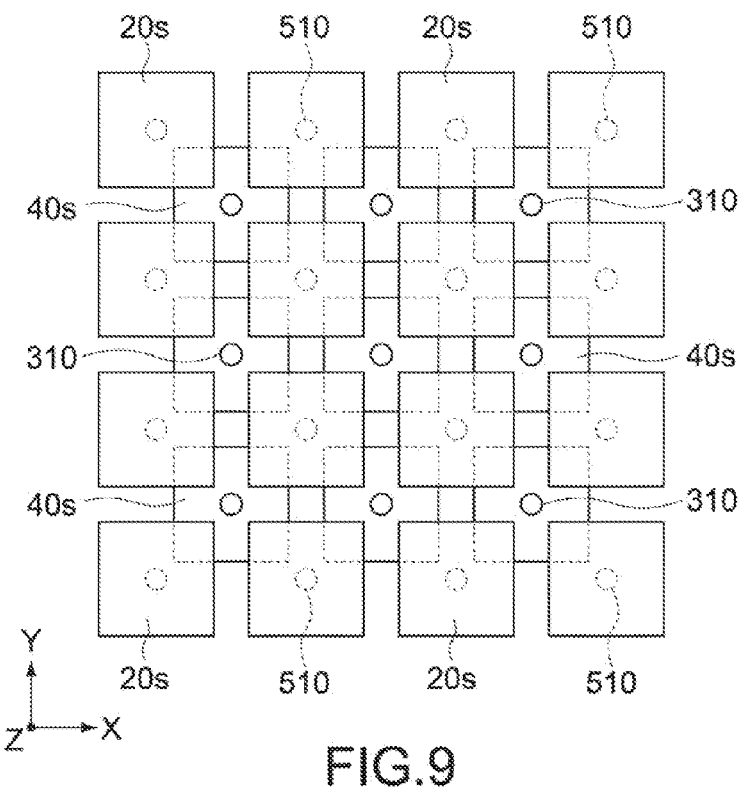
FIG. 9 is a plan view schematically showing a sensor device, which illustrates the position relation of first detectors, first columns, second detectors, and second columns.

Each of FIG. 8 and FIG. 9 shows a second embodiment of the present technology. Hereinafter, the structure different from the structure of the first embodiment will be described mainly. The structure similar to the structure of the above-mentioned embodiment will be denoted by the reference symbols, and description thereof will be omitted or simplified.

FIG. 8 is a side-sectional view schematically showing the input device 200 of this embodiment. FIG. 9 is a plan view schematically showing a sensor device SB seen in the Z-axis direction, which illustrates the position relation of the first detectors 20s, the first columns 310, the second detectors 40s, and the second columns 510.

The input device 200 of this embodiment includes the flexible display D and a sensor device SB. The sensor device SB includes the first sensor S1, the second sensor S2, and the third conductor layer M3. The third conductor layer M3 is arranged between the first sensor S1 and the second sensor S2.

The first sensor S1 includes the first conductor layer M1, the first electrode board 20, and the first support layer 30. The first conductor layer M1 is bonded to the flexible display D. The plurality of first detectors 20s (first capacitive elements) are arranged on the first electrode board 20 in a matrix. The first support layer 30 includes the plurality of first columns 310, and is arranged between the first conductor layer M1 and the first electrode board 20. The second sensor S2 includes the second electrode board 40, the second conductor layer M2, and the second support layer 50. The plurality of second detectors 40s (second capacitive elements) are arranged on the second electrode board 40 in a matrix. The second support layer 50 includes the plurality of second columns 510, and is arranged between the second electrode board 40 and the second conductor layer M2.

Note that in FIG. 8 and FIG. 9, the first detectors 20s and the second detectors 40s are drawn in a simple manner. Only the intersection areas of the electrode wires of the capacitive elements are shown schematically.

The input device 200 of this embodiment is different from the input device 100 described in the first embodiment in the positional relation between the first and second detectors 20s and 40s and in the positional relation between the first and second columns 310 and 510.

When the input device 200 (sensor device SB) of this embodiment is seen in the layered direction (Z-axis direction) of the first sensor S1 the second sensor S2, the centers of the plurality of first detectors 20s are displaced from the centers of the plurality of second detectors 40s, respectively. More specifically, one first detector 20s is arranged at the center of the square including four second detectors 40s.

One second detector 40s is arranged at the center of the square including four first detectors 20s.

Meanwhile, the plurality of first columns 310 are displaced from the plurality of second columns 510 seen in the Z-axis direction. Further, the first columns 310 face the centers of the second detectors 40s, respectively. The second columns 510 face the centers of the first detectors 20s, respectively.

According to the input device 200 of this embodiment structured as described above, also, functions and effects similar to those of the above-mentioned first embodiment may be attained.

Specifically, according to this embodiment, the centers of the first detectors 20s are displaced from the centers of the second detectors 40s. With this structure, the detectors 20s and 40s may be arranged densely under the operation input surface 110. As a result, sensitivity distribution may be closer to flat.

Further, the first columns 310 are arranged around the first detectors 20s seen in the thickness direction. With this structure, the first detectors 20s are capable of detecting an operation input in the operation input surface 110 with a high degree of sensitivity. In addition, the first columns 310 face the second detectors 40s in the Z-axis direction. As a result, the second detectors 40s are capable of detecting an operation input with a pen efficiently. As a result, it is possible to distinguish between an operation input with a finger and an operation input with a pen by using the first and second sensors S1 and S2 with a high degree of accuracy.

Figure 10:
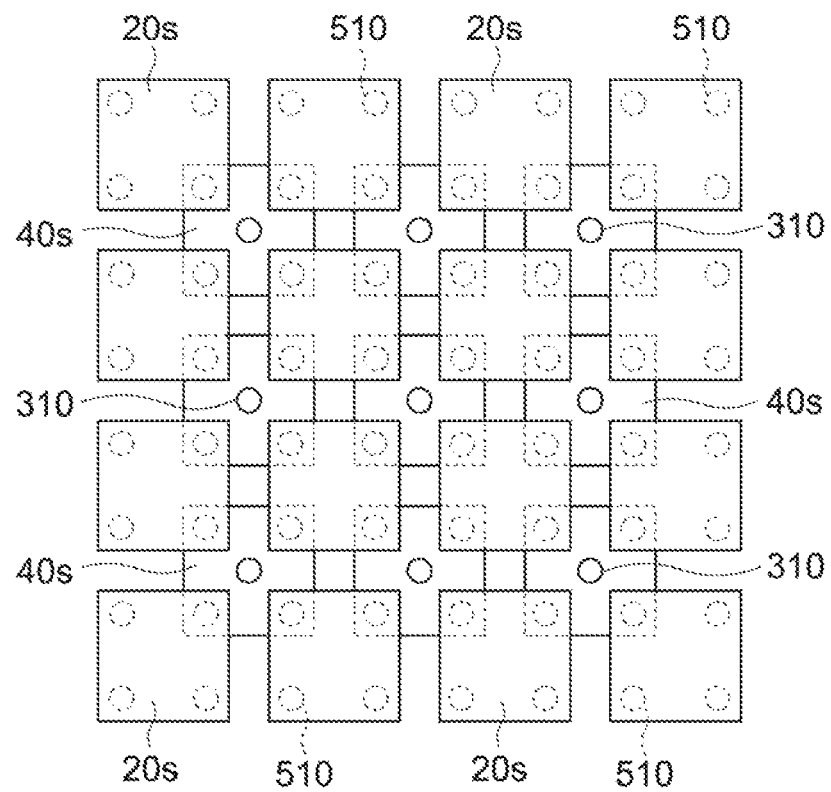
FIG. 10 is a plan view schematically showing the main part of the input device according to a modification example.

Further, the positions or the number of the columns 310 of the first sensor S1 may be different from the positions or the number of the columns 510 of the second sensor S2, whereby sensitivity of the first sensor S1 may be higher than sensitivity of the second sensor S2. FIG. 10 shows an example in which four second columns 510 are arranged immediately below each first detector 20s. In this case, the first sensor S1 may be configured to function as a sensor-for-finger, and the second sensor S2 may be configured to function as a sensor-for-pen, whereby sensitivity of the sensor-for-finger may be higher than sensitivity of the sensor-for-pen. Note that four first columns 310 may be arranged immediately above each second detector 40, whereby sensitivity of the second sensor S2 may be higher than sensitivity of the first sensor S1 (not shown).

Third Embodiment

Figure 11:
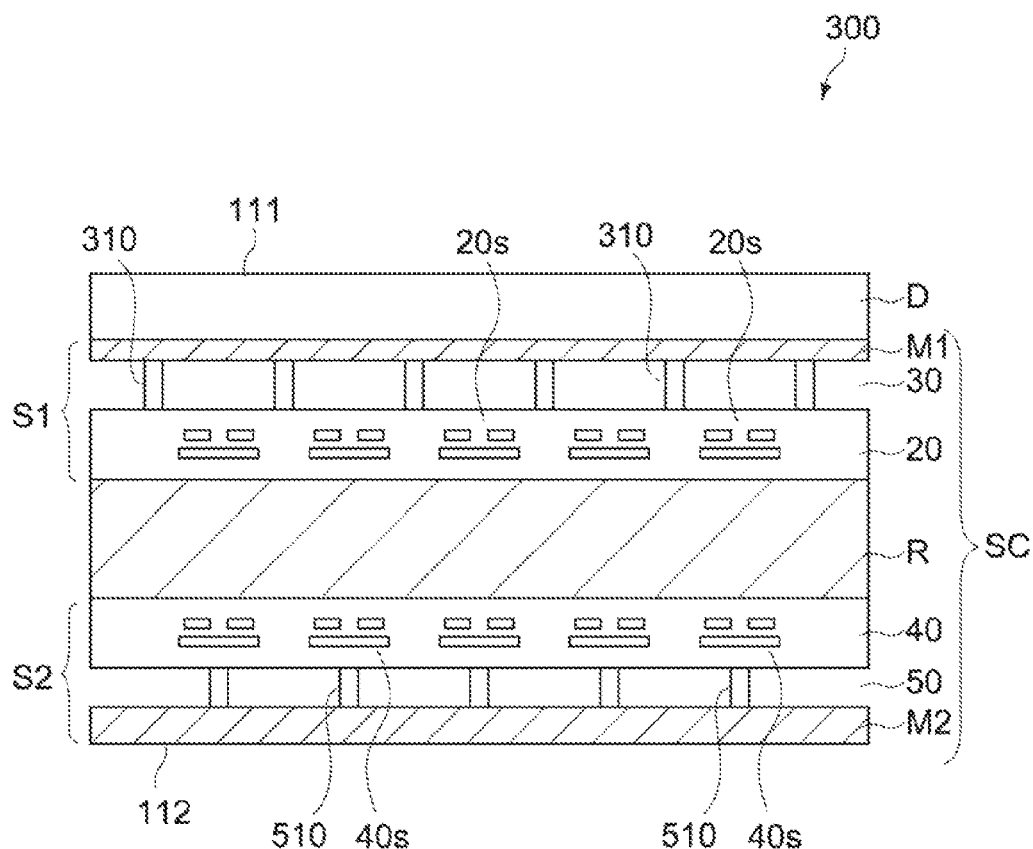
FIG. 11 is a cross-sectional view schematically showing an input device according to a third embodiment of the present technology.

FIG. 11 is a side-sectional view schematically showing an input device 300 according to a third embodiment of the present technology. Hereinafter, the structure different from the structure of the first embodiment will be described mainly. The structure similar to the structure of the above-mentioned embodiments will be denoted by the reference symbols, and description thereof will be omitted or simplified.

The input device 200 of this embodiment includes the flexible display D and a sensor device SC. The sensor device SC includes the first sensor S1, the second sensor S2, and a rigid layer R. The rigid layer R is arranged between the first sensor S1 and the second sensor S2. Note that the controller 60 is not shown.

The rigid layer R is a conductor plate made of for example a metal material. Similar to the first and second conductor layers M1 and M2, the rigid layer R connects with a predetermined reference potential (for example ground potential). The rigidity of the rigid layer R is higher than the rigidity of the first sensor S1 (flexible display D, first conductor layer M1, or first electrode board 20) and higher than the rigidity of the second sensor S2 (second conductor layer M2, or second electrode board 40).

The rigid layer R allows deformation of the first sensor S1 not to be transmitted to the second sensor S2, and allows deformation of the second sensor S2 not to be transmitted to the first sensor S1. Typically, the rigid layer R is a relatively thick metal plate. Note that, alternatively, for example, the rigid layer R may be a resin plate, or may be integrally structured with the electrode board and the like.

The input device 300 of this embodiment includes a first operation input surface 111 and a second operation input surface 112. The first operation input surface 111 is the front surface (upper surface) of the display D. The second operation input surface 112 is the front surface (lower surface) of the second conductor layer M2. That is, the input device 300 allows an operation input in the display D side and an operation input in the second conductor layer M2 side.

An operation input in the first operation input surface 111 is detected based on the capacitance change of the first detectors 20s depending on change of the distance between the first conductor layer M1 and the first electrode board 20. Meanwhile, an operation input in the second operation input surface 112 is detected based on the capacitance change of the second detectors 40s depending on change of the distance between the second conductor layer M2 and the second electrode board 40.

When the detectors 20s and 40s detect capacitance, the rigid layer R, i.e., a conductor, prevents mutual interference from occurring. In addition, the rigidity of the rigid layer R inhibits operational force from being transmitted from one side to the other side. Because of this, even if operational force is simultaneously input in both the operation input surfaces 111 and 112, the first and second detectors 20s and 40s may detect those input operations independently and appropriately.

According to the input device 300 of this embodiment, for example, a user may input operation in the first and second operation input surfaces 111 and 112. For example, a user may input operation with gesture by placing the input device 300 between a thumb and a forefinger of one hand. Alternatively, a user may input operation with gesture by placing the input device 300 between a thumb and a forefinger of one hand and moving the thumb and the forefinger in the X and Y directions, or the like.

The second operation input surface 112 may be the front surface of another layer or member layered on the front surface of the second conductor layer M2. This layer or member may be conductive or nonconductive. Further, this layer or member may be a display device such as a flexible display. In this case, one input device is capable of displaying images in response to operations input by a plurality of users.

In the input device 300 of FIG. 11, the second columns 510 face the second detectors 40s in the thickness direction (Z-axis direction). Alternatively, the second columns 510 may be arranged around the second detectors 40s seen in the thickness direction. Similarly, the first columns 310 are arranged around the first detectors 20s seen in the thickness direction. Alternatively, the first columns 310 may face the first detectors 20s in the thickness direction.

Fourth Embodiment

Figure 12:
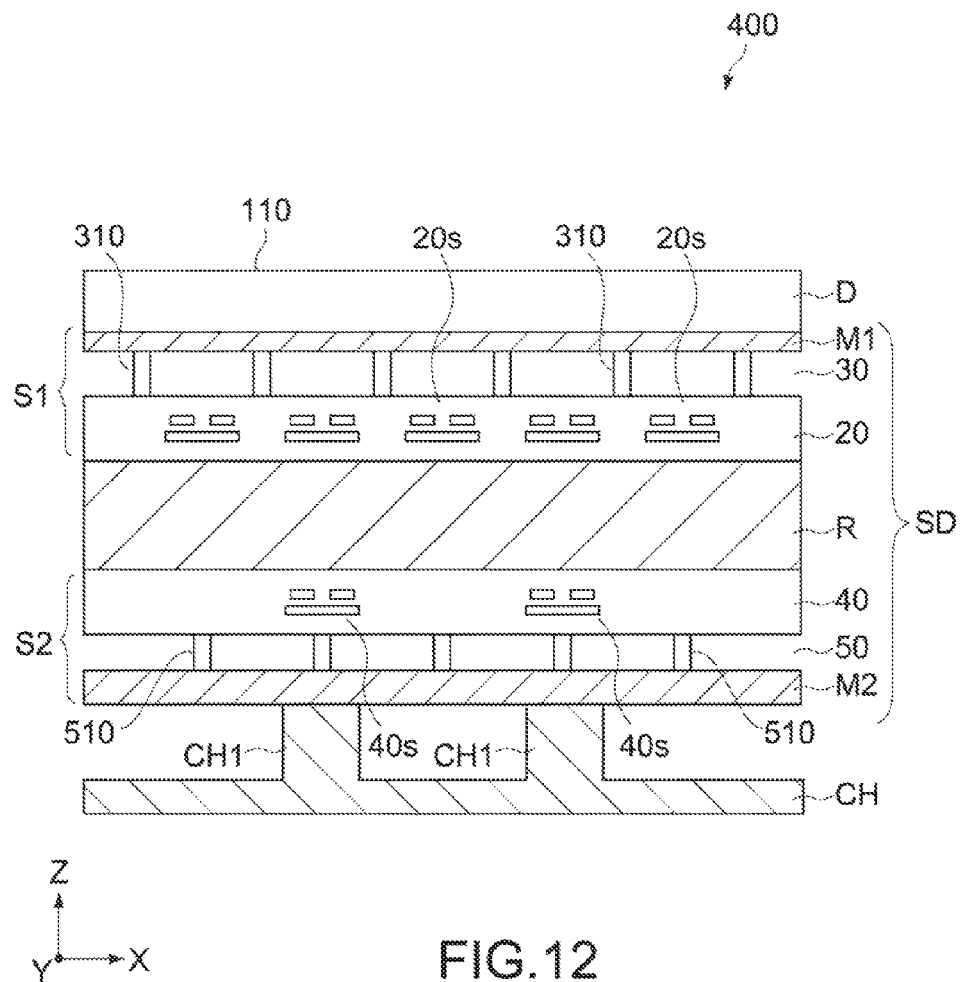
FIG. 12 is a cross-sectional view schematically showing the input device applied to an apparatus according to an example.

FIG. 12 is a side-sectional view schematically showing an input device 400 according to the fourth embodiment of the present technology. Hereinafter, the structure different from the structure of the first embodiment will be described mainly. The structure similar to the structure of the above-mentioned embodiments will be denoted by the reference symbols, and description thereof will be omitted or simplified.

The input device 400 of this embodiment includes the flexible display D, a sensor device SD, and a chassis CH. The sensor device SD includes the first sensor S1, the second sensor S2, and the rigid layer R. The rigid layer R is arranged between the first sensor S1 and the second sensor S2. Note that the controller 60 is not shown.

The chassis CH is a compact made of a metal material, a synthetic resin material, a ceramics material, or the like. The chassis CH is an exterior body covering the back surface and the side periphery of the sensor device SD. A plurality of protrusions CH1 are provided on the inner surface of the chassis CH. The plurality of protrusions CH1 face the second sensor S2, and partially supports the second sensor S2.

Figure 13:
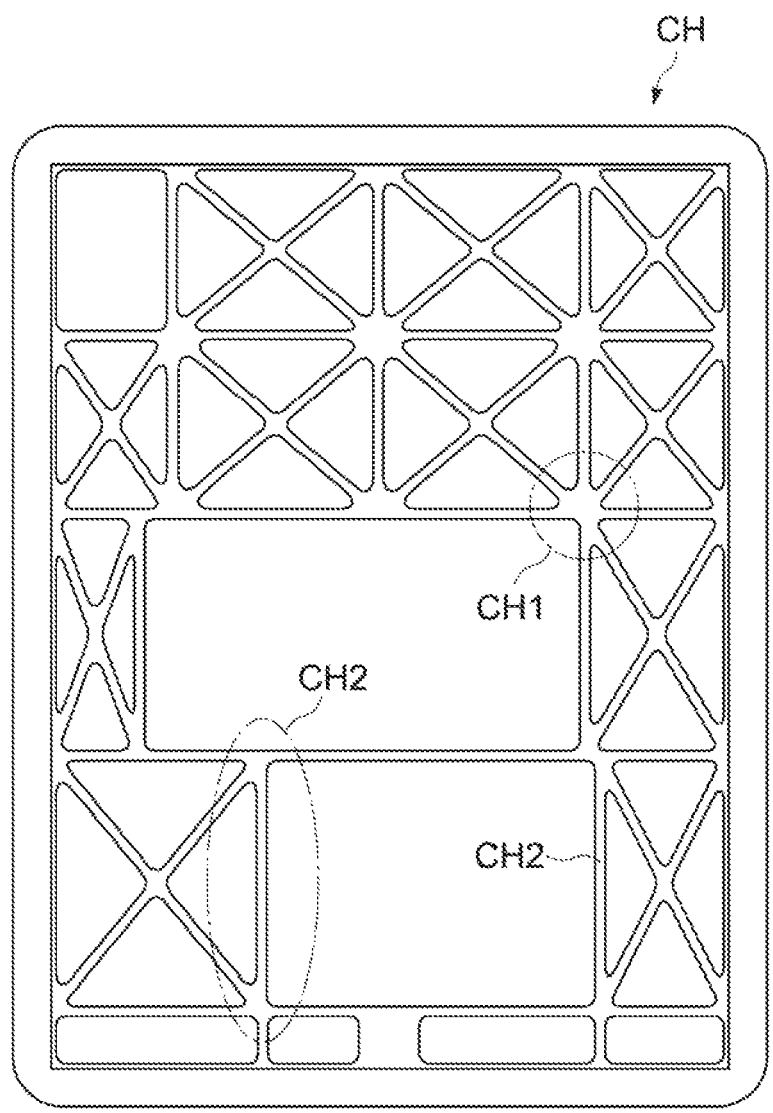
FIG. 13 is a plan view schematically showing the inner structure of a chassis of the input device.

FIG. 13 is a plan view schematically showing the inner structure of the chassis CH. The rib structure CH2 is formed on the inner surface of the chassis CH. The rib structure CH2 includes a plurality of straight ribs in combination. The protrusions CH1 are provided at predetermined portions of the rib structure CH2, and each protrusion CH1 has a predetermined shape. Typically, intersections of a plurality of ribs and the upper surface of a predetermined ribs function as the protrusions CH1.

The protrusions CH1 may not be made of the ribs of the chassis CH, but for example may be made of protrusion members arranged on the inner surface of the chassis. Examples of the protrusion members include clasps, a circuit board, wirings, a battery, a shock-absorbing material, and the like.

Figure 14:
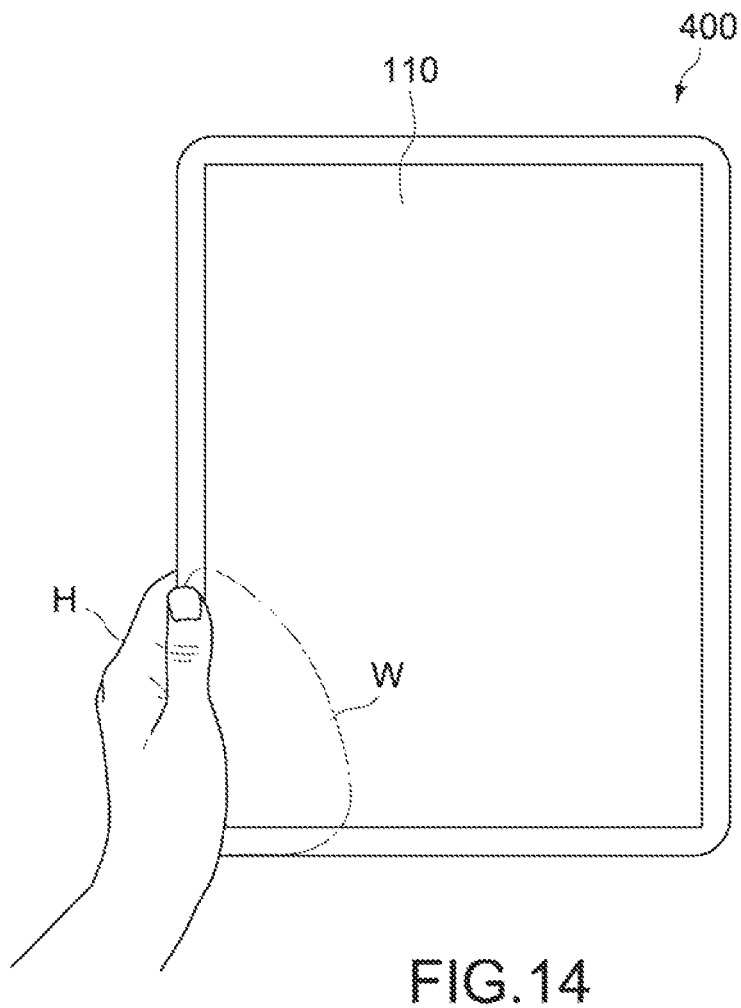
FIG. 14 is a plan view schematically showing an example of the input device operated by a user.

FIG. 14 is a plan view schematically showing an example of the input device 400 operated by a user. In the example shown in FIG. 14, a user grabs one corner of the input device 400 with one hand H, and operates the operation input surface 110 with a finger of the other hand (not shown). In this case, when operational force is applied to the operation input surface 110, reactive force is applied to the back surface (area W of FIG. 14) of the input device 400 via the hand H of the user. The reactive force is different depending on operation positions on the operation input surface 110. The larger the distance between the operation position and the hand H, the larger the reactive force.

At this time, if the second sensor at the back surface detects the above-mentioned reactive force, the input device may malfunction. Further, the first sensor may misdetect deformation of the rigid layer R, which is provided between the first and second sensors S1 and S2, depending on an operation position or operational force.

In view of this, according to this embodiment, the input device 400 is configured, when the second sensor S2 detects a pressure at the back surface of the device, to cancel (disable) input with the pressure. That is, the second sensor S2 is configured to detect pressure on the back surface of the device. The first sensor S1 is configured to detect a normal input in the operation input surface 110. Further, if the first sensor S1 detects deformation of the rigid layer R resulting from high pressure on the back surface and if the second sensor S2 detects the pressure, a signal from the first sensor S1 resulting from the pressure is canceled (disabled). As a result, malfunction of the input device 400 may be inhibited, and the input device 400 may be user-friendly. Note that the signal processor circuit 62 or the controller 710 may cancel (disable) pressure on the back surface.

Specifically, in this embodiment, the chassis CH supports the second sensor S2 only with the protrusions CH1. With this structure, irrespective of the way to hold the input device, operation reactive force applied to a certain position may always be detected. As a result, signals from the detectors 40s in the limited area and the area therearound are to be canceled.

Further as described above, operation reactive force occurs at a limited position. Because of this, it is not necessary to arrange the detectors 40s for detecting the operation reactive force in a matrix. That is, all the second detectors 40s may face the protrusions CH1 of the chassis CH (see FIG. 12).

MODIFICATION EXAMPLES

Hereinafter, the embodiments of the present technology have been described. The present technology is not limited to the above-mentioned embodiments, and as a matter of course may be variously changed within the gist of the present technology.

Modification Example 1

Controller

Figure 15:
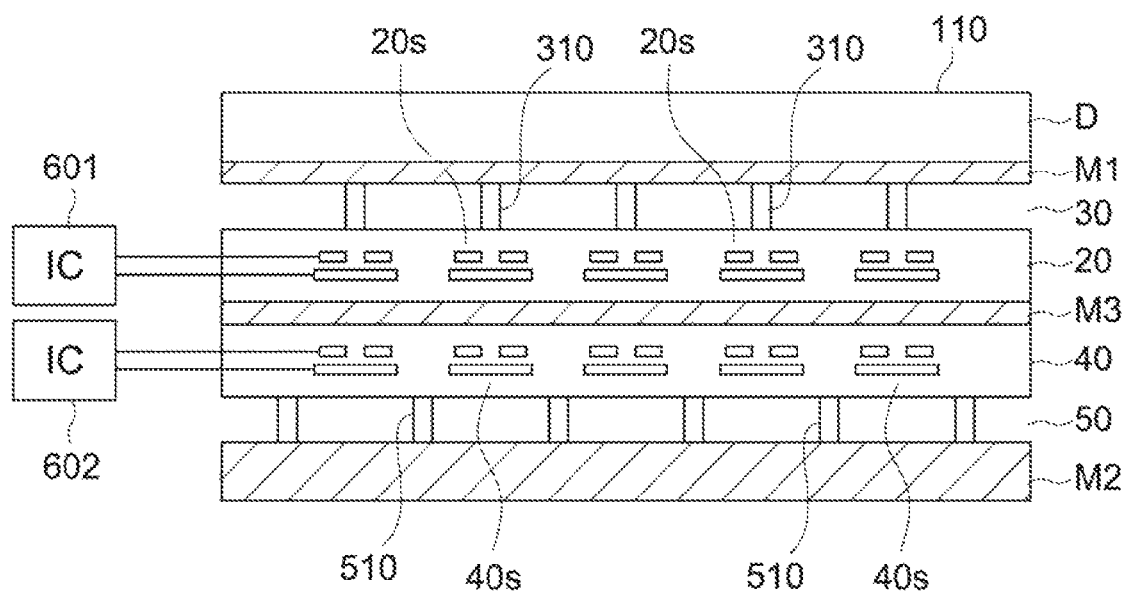
FIG. 15 is a cross-sectional view schematically showing an input device according to a modification example of the first embodiment.

For example, according to the input device of the above-mentioned embodiments, the controller 60 is configured to determine capacitance change amounts of the plurality of first and second detectors 20s and 40s. Alternatively, as schematically shown in FIG. 15, in the input device, a first controller device 601 may electrically connect with a first electrode board 20, and a second controller device 602 may electrically connect with a second electrode board 40. The controller device 601 may be configured to determine capacitance change amounts of the detectors 20s, and the controller device 602 may be configured to determine capacitance change amounts of the detectors 40s.

Modification Example 2

Electrode Wire

Figure 16A:
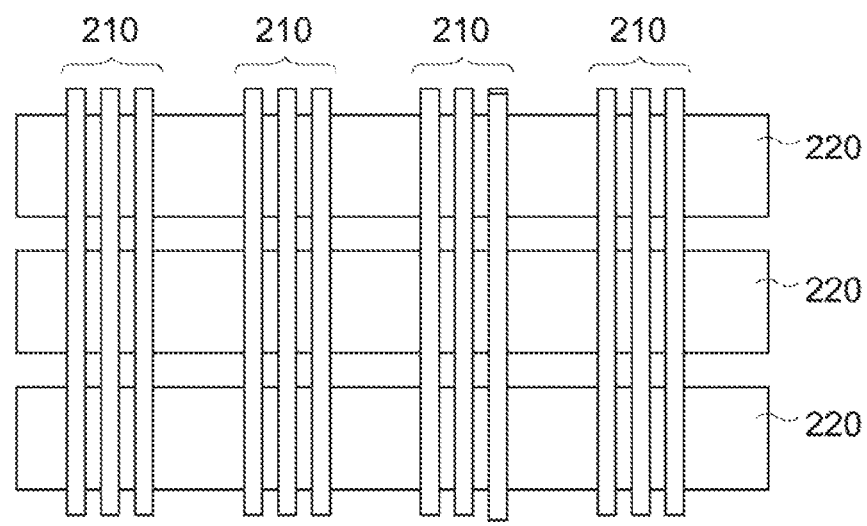
Figure 16B:
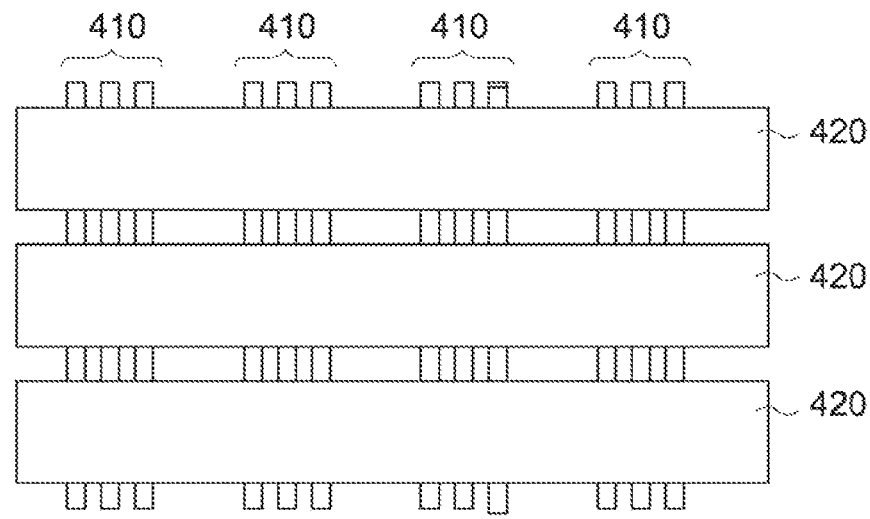

In the first embodiment, each of the plurality of first and third electrode wires 210 and 410 is formed by an electrode wire group (sub-electrodes) including a plurality of electrode wires. Each of the plurality of second and fourth electrode wires 220 and 420 is formed by an electrode wire group (sub-electrodes) including a plurality of electrode wires. Alternatively, as shown in FIG. 16A, each electrode wire of the plurality of second electrode wires 220 may be wider than each electrode wire of the plurality of first electrode wires 210. As shown in FIG. 16B, each electrode wire of the plurality of fourth electrode wires 420 may be wider than each electrode wire of the plurality of third electrode wires 410. FIG. 16A is a plan view showing the main part of the first electrode board 20 according to another electrode structure example. FIG. 16B is a plan view showing the main part of the second electrode board 40 according to another electrode structure example.

Further, each of the plurality of first and third electrode wires 210 and 410 is formed by an electrode wire group including a plurality of electrode wires. To the contrary, each of the plurality of first and third electrode wires 210 and 410 may be formed by a single electrode wire.

Figure 17:
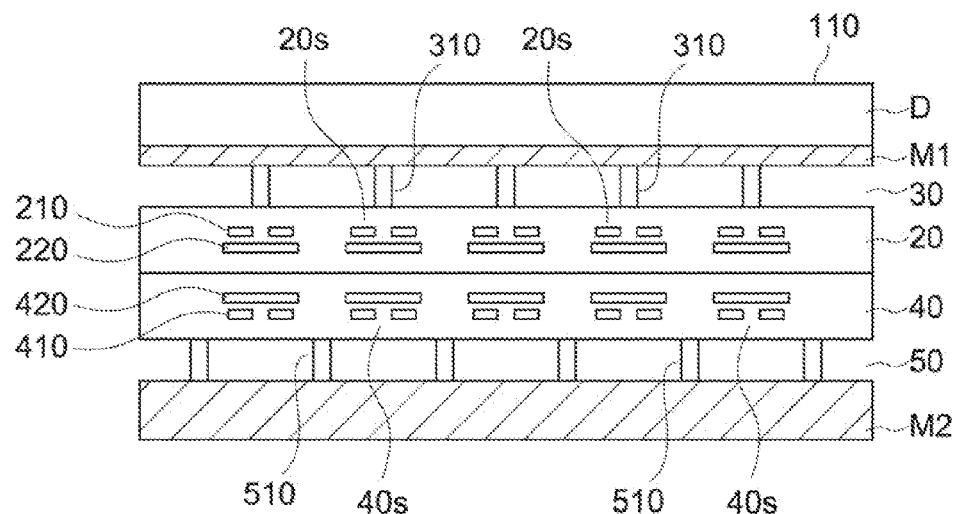
FIG. 17 is a cross-sectional view schematically showing an input device according to a modification example of the first embodiment.

According to the first embodiment, in the second electrode board 40, the third electrode wires 410 are above the fourth electrode wires 420, i.e., are closer to the upper layer (first electrode board 20). Alternatively, as schematically shown in FIG. 17, the fourth electrode wires 420 may be above the third electrode wires 410, i.e., are closer to the upper layer.

In this case, preferably, the plurality of first electrode wires 210 are above the plurality of second electrode wires 220, i.e., are closer to the first support layer 30. Preferably, the plurality of third electrode wires 410 are below the plurality of fourth electrode wires 420, i.e., are closer to the second support layer 50. Further, in this case, preferably, the plurality of second electrode wires 220 face the plurality of fourth electrode wires 420, respectively. In a mutual-capacitance-type (capacitance-reduction-type) device, the first, second, and third conductor layers M1, M2, and M3 absorb electric fields leaking from the ends of the electrode wires. Capacitance change is determined based on the amounts of the absorbed electric fields. Because of this, if electrode wires each including a plurality of sub-electrode wires are arranged closer to the deformable layer (support layer) of each sensor, larger capacitance change may be obtained.

Each electrode wire forming the plurality of second and fourth electrode wires 220 and 420 is a wide electrode, i.e., a single electrode. Because of this, if the second and fourth electrode wires 220 and 420 connect with the controller 60 as the driver electrode (E11, E21), they also function as shields.

That is, if the plurality of second electrode wires 220 are closer to the flexible display D, the plurality of second electrode wires 220 are capable of shielding noise from the flexible display D. If the plurality of second electrode wires 220 are closer to the second sensor S2, the plurality of second electrode wires 220 are capable of shielding noise from the second sensor S2.

If the plurality of fourth electrode wires 420 are closer to the second conductor layer M2, the plurality of fourth electrode wires 420 are capable of shielding noise from an electric circuit or the like mounted on the back surface of the second conductor layer M2. If the plurality of fourth electrode wires 420 are closer to the first sensor S1, the plurality of fourth electrode wires 420 are capable of shielding noise from the first sensor S1.

Note that the larger the area ratio of gaps between the sub-electrodes to the sub-electrodes, the larger the influence of noise. In view of this, preferably, the area ratio of the gaps to the sub-electrodes of each electrode wire of the plurality of second and fourth electrode wires 220 and 420 is smaller than the area ratio of the gaps to the sub-electrodes of each electrode wire of the plurality of first and third electrode wires 210 and 410. In other words, preferably, the gaps between the sub-electrodes of each electrode wire of the plurality of second and fourth electrode wires 220 and 420 are narrower than the gaps between the sub-electrodes of each electrode wire of the plurality of first and third electrode wires 210 and 410.

Further, in this case, the second and fourth electrode wires 220 and 420 are wider than the first and third electrode wires 210 and 410, and the second electrode wires 220 face the fourth electrode wires 420. Further, if the second and fourth electrode wires 220 and 420 connect with the controller 60 as the driver electrodes (E11, E21), the third conductor layer M3 may be omitted as shown in FIG. 17. That is, the driver electrodes (E11, E21) are less affected by noise than the detector electrodes (E12, E22). In addition, because the driver electrodes (E11, E21) are wide, they function as shields. As a result, the second and fourth electrode wires 220 and 420 may function as the third conductor layer M3.

Figure 18:
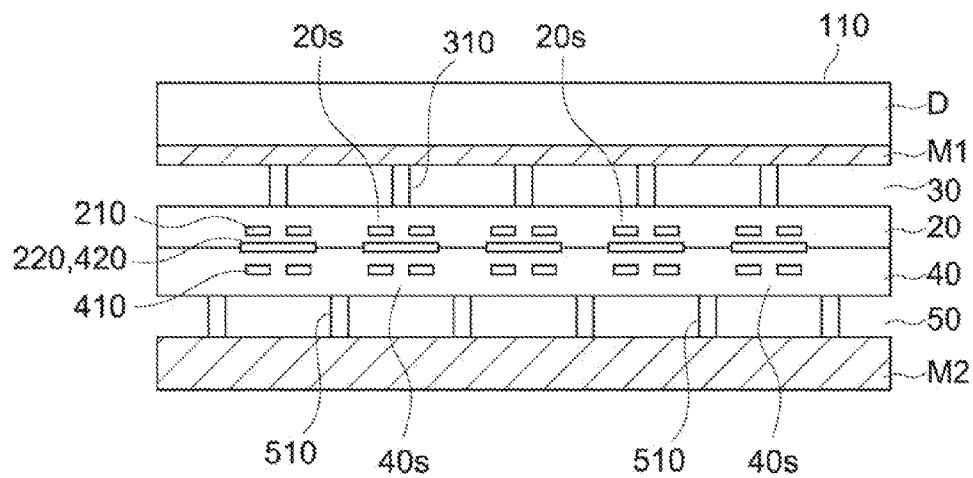
FIG. 18 is a cross-sectional view schematically showing an input device according to a modification example of the first embodiment.

Further, in the above-mentioned example, the second electrode wires 220 face the fourth electrode wires 420. The second electrode wires 220 function as the driver electrodes (E11), and the fourth electrode wires 420 function as the driver electrodes (E21). In this case, as schematically shown in FIG. 18, common electrode wires may be configured to function as the second electrode wires 220 and the fourth electrode wires 420. As a result, the number of the wiring layers may be decreased, and the sensor device may be thinner.

Modification Example 3

Layer Structure of Sensor

Figure 19:
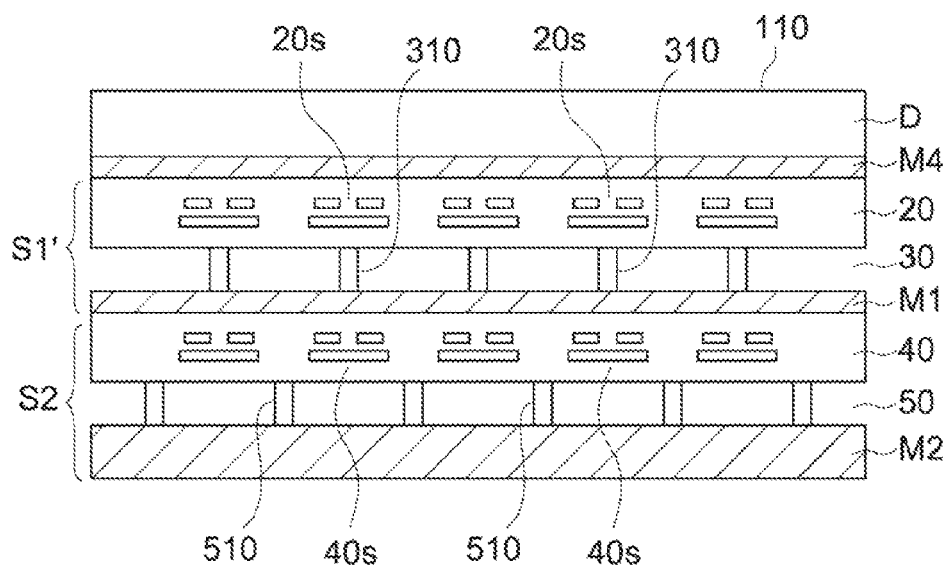
FIG. 19 is a cross-sectional view schematically showing an input device according to a modification example of the first embodiment.

In the first embodiment, the first sensor S1 includes the first electrode board 20, the first support layer 30, and the first conductor layer M1 in order from the lower layer side. However, the layer structure of the first sensor S1 is not limited to this. For example, as schematically shown in FIG. 19, a first sensor SF may include the first conductor layer M1, the first support layer 30, and the first electrode board 20 in order from the lower layer side. In this case, the operation input surface 110 is provided on the first electrode board 20 side. The first conductor layer M1 is layered on the second electrode board 40. A fourth conductor layer M4 is arranged between the first electrode board 20 and the flexible display D, and connects with for example a ground potential. With this structure, also, functions and effects similar to those of the first embodiment may be attained.

Figure 20:
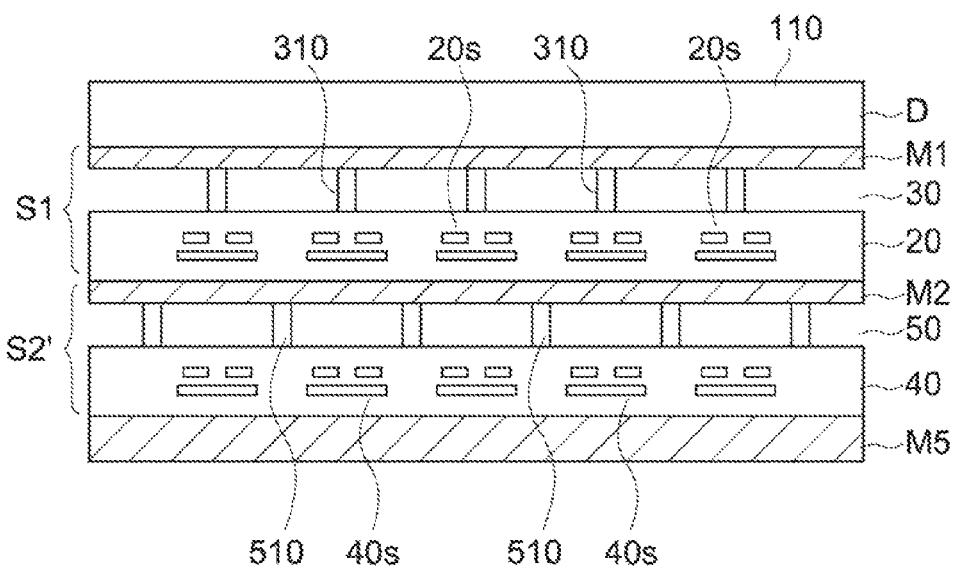
FIG. 20 is a cross-sectional view schematically showing an input device according to a modification example of the first embodiment.

According to the first embodiment, the second sensor S2 includes the second conductor layer M2, the second support layer 50, and the second electrode board 40 in order from the lower layer side. However, the layer structure of the second sensor S2 is not limited to this. For example as schematically shown in FIG. 20, the second sensor S2' may include the second electrode board 40, the second support layer 50, and the second conductor layer M2 in order from the lower layer side. In this case, the operation input surface 110 is provided on the first conductor layer M1 side. The first electrode board 20 is layered on the second conductor layer M2. A fifth conductor layer M5 is arranged on the lower surface side of the second electrode board 40, and connects with for example a ground potential. With this structure, also, functions and effects similar to those of the first embodiment may be attained.

Figure 21:
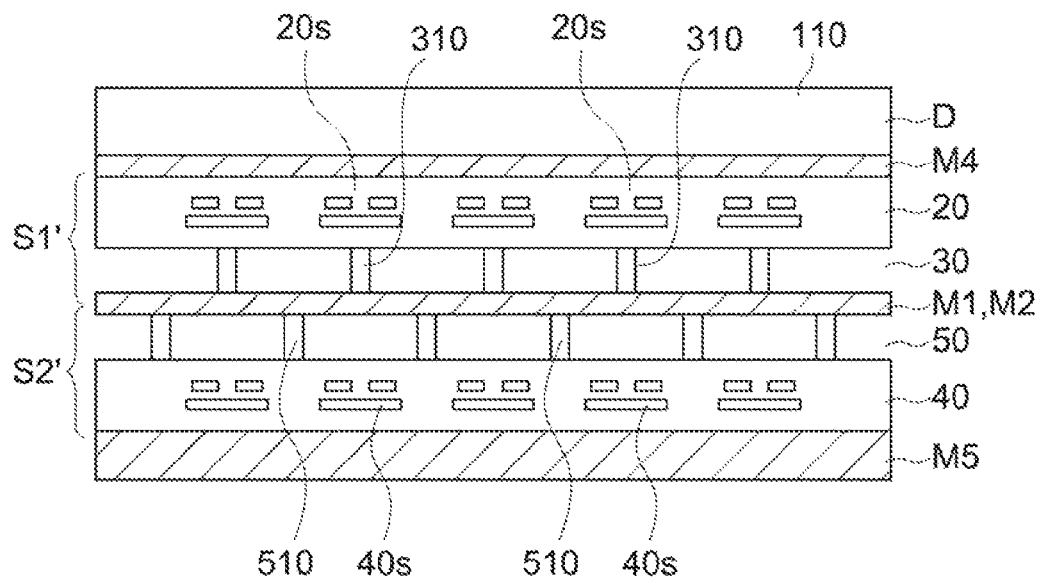
FIG. 21 is a cross-sectional view schematically showing an input device according to a modification example of the first embodiment.

FIG. 21 is a cross-sectional view schematically showing an input device including the first sensor S1' and the second sensor S2' in combination. The operation input surface 110 is provided at the first electrode board 20 side. A common conductor layer is configured to function as the first conductor layer M1 and the second conductor layer M2. In this case, also, the fourth conductor layer M4 is arranged between the first electrode board 20 and the flexible display D. The fifth conductor layer M5 is arranged on the lower surface side of the second electrode board 40. With this structure, also, functions and effects similar to those of the first embodiment may be attained. Further, because the first conductor layer M1 is layered on the second conductor layer M2, a common conductor layer may be configured to function as the first conductor layer M1 and the second conductor layer M2.

Modification Example 4

Third Support Layer

Figure 22:
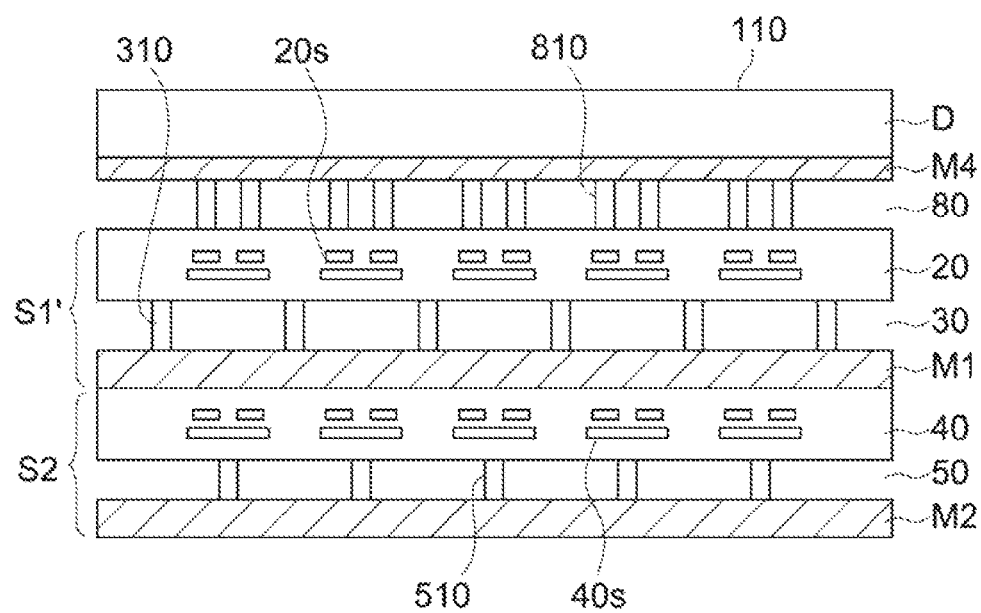
FIG. 22 is a cross-sectional view schematically showing an input device according to a modification example of the first embodiment.

FIG. 22 is a cross-sectional view schematically showing an input device including the first sensor S1' and the second sensor S2 in combination. Further, a third support layer 80 is arranged between the first sensor S1' and the flexible display D (and fourth conductor layer M4). In this example, the third support layer 80 is arranged between the first electrode board 20 and the flexible display D. Note that, if the first sensor S1' includes the flexible display D, the third support layer 80 is arranged between the operation input surface 110 and the first electrode board 20.

Similar to the first and second support layers 30 and 50, the third support layer 80 may include a plurality of columns 810 (third columns). In this example, the first columns 310 are displaced from the centers of the first detectors 20s. The second columns 510 are arranged at positions facing the centers of the second detectors 40s. As a matter of course, the structure is not limited to this example.

With this structure, also, functions and effects similar to those of the first embodiment may be attained. Further, because the third support layer 80 is provided, detection sensitivity of the first sensor S1 may be optimized arbitrarily. In addition, improved press-operation feeling may be obtained when a user presses the operation input surface 110.

Figure 23:
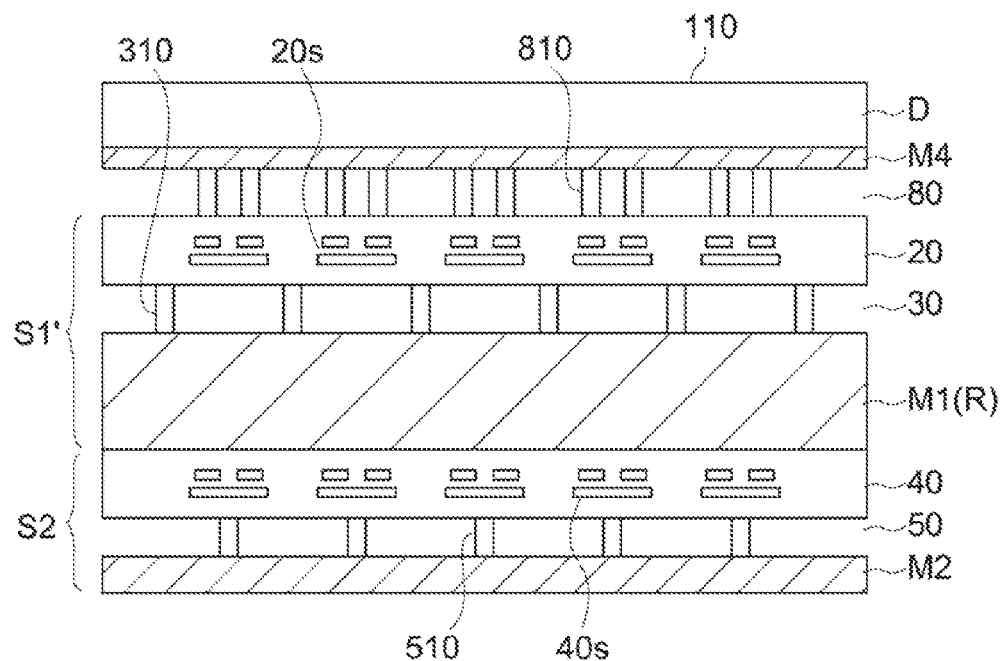
FIG. 23 is a cross-sectional view schematically showing an input device according to a modification example of the first embodiment.

FIG. 23 shows an example in which the rigid layer R is configured to function as the first conductor layer M1 of the input device of FIG. 22. With this structure, also, functions and effects similar to those of the first embodiment may be attained. Further, because the third support layer 80 is provided, detection sensitivity of the first sensor S1 may be optimized arbitrarily. In addition, improved press-operation feeling may be obtained when a user presses the operation input surface 110.

Figure 24:
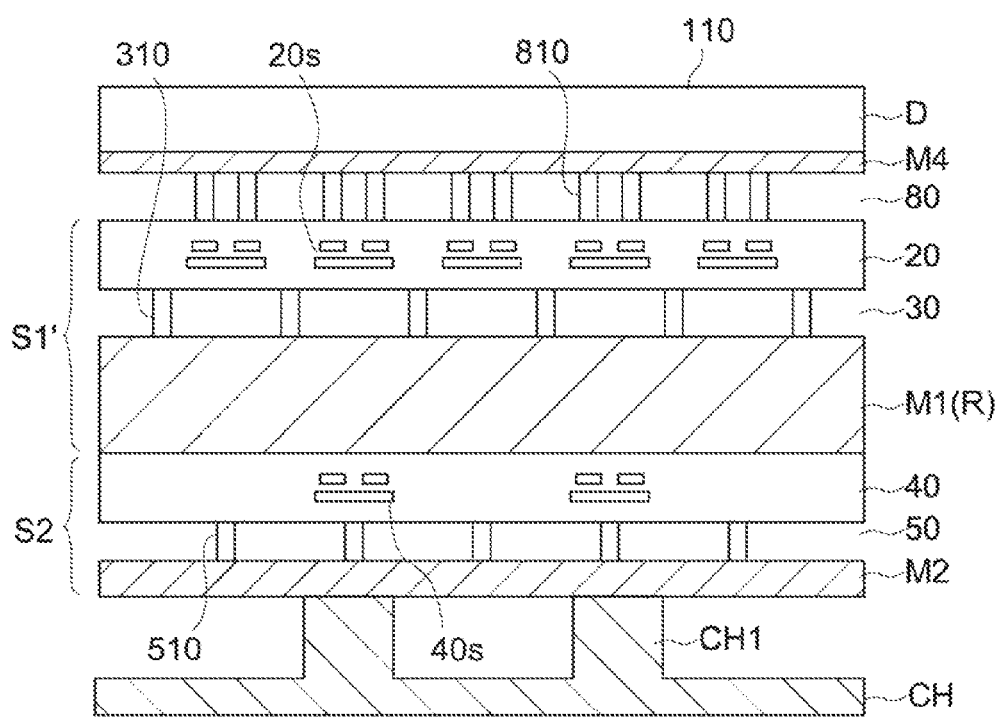
FIG. 24 is a cross-sectional view schematically showing an input device according to a modification example of the first embodiment.

FIG. 24 shows an example in which the input device of FIG. 23 and the chassis CH are structured in combination. With this structure, also, functions and effects similar to those of the third embodiment may be attained.

Modification Example 5

Sub-Electrode

According to the first embodiment, each of the plurality of first and second electrode wires 210 and 220 is a straight electrode wire. Alternatively, each first wire 210 may have the shape shown in FIG. 25A, and each second wire 220 may have the shape shown in FIG. 25B.

FIG. 25A is a plan view schematically showing the structure of the first electrode wire 210 according to a modification example. For example, the first electrode wire 210 includes a plurality of electrode units 210m, and a plurality of couplers 210n. Each of the plurality of couplers 210n couples the plurality of electrode units 210m. Each electrode unit 210m includes a plurality of sub-electrodes (electrode elements) 210w. The plurality of sub-electrodes 210w are a plurality of electrode elements made of a branched electrode wire. The plurality of sub-electrodes 210w form a regular or irregular pattern. FIG. 25A shows an example in which the plurality of sub-electrodes 210w form a regular pattern. In this example, the plurality of sub-electrodes 210w are linear conductive members extending in the Y-axis direction. The conductive members are arrayed in stripes. The coupler 210n extends in the Y-axis direction, and couples the adjacent electrode units 210m.

FIG. 25B is a plan view schematically showing the structure of the second electrode wire 220 according to a modification example. For example, the second electrode wire 220 includes a plurality of electrode units 220m, and a plurality of couplers 220n. Each of the plurality of couplers 220n couples the plurality of electrode units 220m. Each electrode unit 220m includes a plurality of sub-electrodes (electrode elements) 220w. The plurality of sub-electrodes 220w form a regular or irregular pattern. FIG. 25B shows an example in which the plurality of sub-electrodes 220w form a regular pattern. In this example, the plurality of sub-electrodes 220w are linear conductive members extending in the X-axis direction. The conductive members are arrayed in stripes. The coupler 220n extends in the X-axis direction, and couples the adjacent electrode units 220m.

Seen in the Z-axis direction, the first electrode wires 210 intersect with the second electrode wires 220 so that the electrode units 210m may face and overlap with the electrode units 220m in the Z-axis direction. The intersection areas are configured to function as detectors 20s. Note that the structure of each of the electrode units 210m and 220m is not limited to the above-mentioned structure, and may have each of various structures.

The above-mentioned structure may be applied to not only each of the plurality of first and second electrode wires 210 and 220, but also each of the plurality of third and fourth electrode wires 410 and 420.

Modification Example 6

Support Layer

Figure 26A:
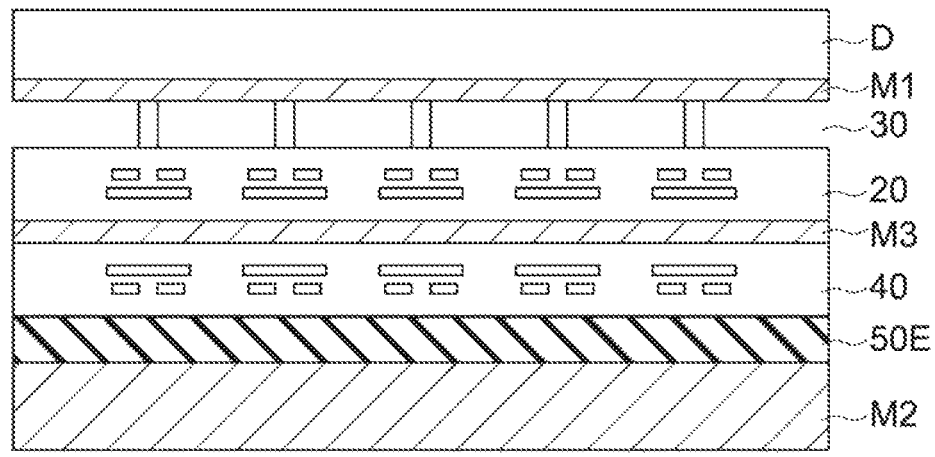
FIGS. 26A and 26B are cross-sectional views schematically showing an input device according to a modification example of the first embodiment.
Figure 26B:
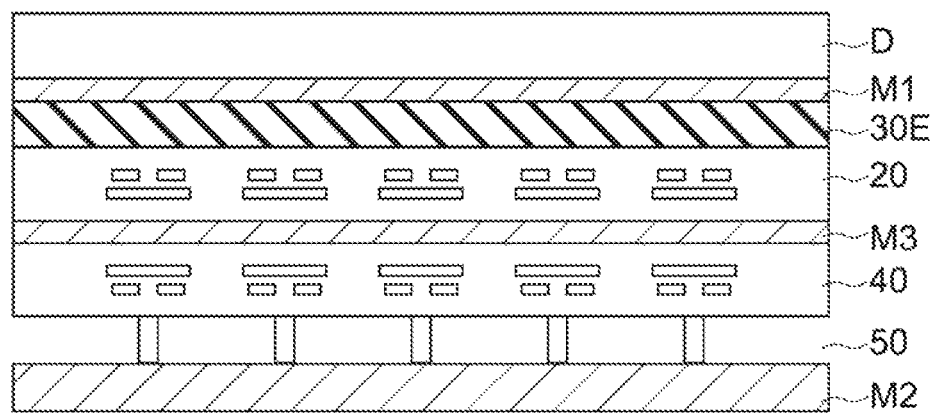

In the first embodiment, each of the first and second support layers 30 and 50 includes a plurality of columns. Alternatively, for example FIG. 26A shows an example in which a second support layer 50E is made of an elastic layer, i.e., a rubber sheet or the like. FIG. 26B shows an example in which a first support layer 30E is made of the elastic layer. As a matter of course, both the first and second support layers may be made of the above-mentioned elastic layers.

Note that the present technology may employ the following structures.

(1) A sensor device, comprising:
  a first sensor including
    a first electrode board including a plurality of first capacitive elements arranged in a matrix,
    a first conductor layer facing the first electrode board,
    a first support layer arranged between the first electrode board and the first conductor layer, the first support layer being deformable, and
    a first operation input surface provided on one of the first electrode board and the first conductor layer,
    at least one of the first electrode board and the first conductor layer being flexible; and
  a second sensor layered on the first sensor, the second sensor including
    a second electrode board including a plurality of second capacitive elements,
    a second conductor layer facing the second electrode board, and
    a second support layer arranged between the second electrode board and the second conductor layer, the second support layer being deformable,
    at least one of the second electrode board and the second conductor layer being flexible.

(2) The sensor device according to the item (1), wherein the first operation input surface is provided on the first conductor layer, and
  the first electrode board is layered on the second electrode board.

(3) The sensor device according to the item (2), further comprising:
a third conductor layer arranged between the first electrode board and the second electrode board.
(4) The sensor device according to the item (1), wherein
the first operation input surface is provided on the first electrode board, and
the first conductor layer is layered on the second electrode board.
(5) The sensor device according to the item (1), wherein
the first operation input surface is provided on the first conductor layer, and
the first electrode board is layered on the second conductor layer.
(6) The sensor device according to the item (1), wherein
the first operation input surface is provided on the first electrode board, and
a common conductor layer is configured to function as the first conductor layer and the second conductor layer.
(7) The sensor device according to any one of the items (1) to (6), wherein
the plurality of second capacitive elements are arranged in a matrix on the second electrode board.
(8) The sensor device according to any one of the items (1) to (7), wherein
when an operation is input in the first operation input surface, capacitance changes of the plurality of second capacitive elements are larger than capacitance changes of the plurality of first capacitive elements.
(9) The sensor device according to any one of the items (1) to (8), wherein
the centers of the plurality of first capacitive elements are displaced from the centers of the plurality of second capacitive element, respectively, seen in the layered direction of the first sensor and the second sensor.
(10) The sensor device according to any one of the items (1) to (9), wherein
the first support layer includes a plurality of first columns.
(11) The sensor device according to any one of the items (1) to (10), wherein
the second support layer includes a plurality of second columns.
(12) The sensor device according to any one of the items (1) to (9), wherein
the first support layer includes a plurality of first columns, the plurality of first columns facing the centers of the plurality of second capacitive elements, respectively, and
the second support layer includes a plurality of second columns, the plurality of second columns facing the centers of the plurality of first capacitive elements, respectively.
(13) The sensor device according to any one of the items (1) to (12), wherein
the first electrode board includes
a plurality of first electrode wires, and
a plurality of second electrode wires intersecting with the plurality of first electrode wires, the plurality of first capacitive elements being formed on intersection areas of the plurality of first electrode wires and the plurality of second electrode wires, and
the second electrode board includes
a plurality of third electrode wires facing the plurality of first electrode wires, and
a plurality of fourth electrode wires intersecting with the plurality of third electrode wires, the plurality of second capacitive elements being formed on intersection areas of the plurality of third electrode wires and the plurality of fourth electrode wires.
(14) The sensor device according to the item (13), wherein
at least ones of the plurality of first electrode wires and the plurality of second electrode wires include sub-electrodes in areas corresponding to the plurality of first capacitive elements.
(15) The sensor device according to the item (13) or (14), wherein
at least ones of the plurality of second electrode wires and the plurality of fourth electrode wires include sub-electrodes in areas corresponding to the plurality of second capacitive elements.
(16) The sensor device according to the item (14), wherein
ones of the plurality of first electrode wires and the plurality of second electrode wires are arranged on the first support layer and include sub-electrodes.
(17) The sensor device according to the item (15), wherein
ones of the plurality of third electrode wires and the plurality of fourth electrode wires are arranged on the second support layer and include sub-electrodes.
(18) The sensor device according to any one of the items (13) to (17), wherein
common electrode wires are configured to function as the plurality of second electrode wires and the plurality of fourth electrode wires, respectively.
(19) The sensor device according to any one of the items (14) to (18), wherein
the plurality of second electrode wires are wider than the plurality of first electrode wires, or gaps between the sub-electrodes of the plurality of second electrode wires are narrower than gaps between the sub-electrodes of the plurality of first electrode wires,
the plurality of fourth electrode wires are wider than the plurality of third electrode wires, or gaps between the sub-electrodes of the plurality of fourth electrode wires are narrower than gaps between the plurality of third electrode wires, and
the plurality of second electrode wires face the plurality of fourth electrode wires.
(20) The sensor device according to any one of the items (1) to (19), further comprising:
a controller electrically connecting with the first electrode board and the second electrode board, wherein
the controller is configured to generate a control signal in response to an operation input in the first operation input surface based on capacitance change of the plurality of first capacitive elements and capacitance change of the plurality of second capacitive elements.
(21) The sensor device according to the item (20), wherein
the controller includes
a first controller device electrically connecting with the first electrode board, and
a second controller device electrically connecting with the second electrode board.
(22) The sensor device according to any one of the items (1) to (21), wherein
the first sensor further includes a third support layer arranged between the first operation input surface and the first electrode board.
(23) The sensor device according to any one of the items (1) to (22), further comprising:
a rigid layer arranged between the first sensor and the second sensor, rigidity of the rigid layer being higher than rigidity of the first sensor and rigidity of the second sensor.
(24) The sensor device according to the item (23), further comprising:
a protrusion member facing the second sensor, the protrusion member partially supporting the second sensor.

(25) The sensor device according to the item (24), wherein the protrusion member is one of a chassis, a clasp, a circuit board, a wiring, a battery, and a shock-absorbing material.

(26) The sensor device according to the item (24) or (25), wherein the plurality of second capacitive elements face the protrusion member.

(27) The sensor device according to any one of the items (1) to (26), wherein the second sensor further includes a second operation input surface provided on one of the second electrode board and the second conductor layer.

(28) The sensor device according to any one of the items (1) to (27), wherein the first sensor further includes a display unit layered on at least one of the first conductor layer and the first electrode board, and the first operation input surface is a display surface of the display unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A sensor device, comprising:
    a first sensor including
        a first electrode board including a plurality of first capacitive elements arranged in a matrix,
        a first conductor layer facing the first electrode board,
        a first support layer arranged between the first electrode board and the first conductor layer, the first support layer being deformable, and
        a first operation input surface provided on one of the first electrode board and the first conductor layer,
        at least one of the first electrode board and the first conductor layer being flexible; and
    a second sensor layered on the first sensor, the second sensor including
        a second electrode board including a plurality of second capacitive elements,
        a second conductor layer facing the second electrode board, and
        a second support layer arranged between the second electrode board and the second conductor layer, the second support layer being deformable,
        at least one of the second electrode board and the second conductor layer being flexible.

2. The sensor device according to claim 1, wherein the first operation input surface is provided on the first conductor layer, and the first electrode board is layered on the second electrode board.

3. The sensor device according to claim 2, further comprising:
    a third conductor layer arranged between the first electrode board and the second electrode board.

4. The sensor device according to claim 1, wherein the first operation input surface is provided on the first electrode board, and the first conductor layer is layered on the second electrode board.

5. The sensor device according to claim 1, wherein the first operation input surface is provided on the first conductor layer, and the first electrode board is layered on the second conductor layer.

6. The sensor device according to claim 1, wherein the first operation input surface is provided on the first electrode board, and a common conductor layer is configured to function as the first conductor layer and the second conductor layer.

7. The sensor device according to claim 1, wherein the plurality of second capacitive elements are arranged in a matrix on the second electrode board.

8. The sensor device according to claim 1, wherein when an operation is input in the first operation input surface, capacitance changes of the plurality of second capacitive elements are larger than capacitance changes of the plurality of first capacitive elements.

9. The sensor device according to claim 1, wherein the centers of the plurality of first capacitive elements are displaced from the centers of the plurality of second capacitive element, respectively, seen in the layered direction of the first sensor and the second sensor.

10. The sensor device according to claim 1, wherein the first support layer includes a plurality of first columns.

11. The sensor device according to claim 1, wherein the second support layer includes a plurality of second columns.

12. The sensor device according to claim 1, wherein the first support layer includes a plurality of first columns, the plurality of first columns facing the centers of the plurality of second capacitive elements, respectively, and the second support layer includes a plurality of second columns, the plurality of second columns facing the centers of the plurality of first capacitive elements, respectively.

13. The sensor device according to claim 1, wherein the first electrode board includes
    a plurality of first electrode wires, and
    a plurality of second electrode wires intersecting with the plurality of first electrode wires, the plurality of first capacitive elements being formed on intersection areas of the plurality of first electrode wires and the plurality of second electrode wires, and
the second electrode board includes
    a plurality of third electrode wires facing the plurality of first electrode wires, and
    a plurality of fourth electrode wires intersecting with the plurality of third electrode wires, the plurality of second capacitive elements being formed on intersection areas of the plurality of third electrode wires and the plurality of fourth electrode wires.

14. The sensor device according to claim 13, wherein at least ones of the plurality of first electrode wires and the plurality of second electrode wires include sub-electrodes in areas corresponding to the plurality of first capacitive elements.

15. The sensor device according to claim 14, wherein ones of the plurality of first electrode wires and the plurality of second electrode wires are arranged on the first support layer and include sub-electrodes.

16. The sensor device according to claim 14, wherein the plurality of second electrode wires are wider than the plurality of first electrode wires, or gaps between the sub-electrodes of the plurality of second electrode wires are narrower than gaps between the sub-electrodes of the plurality of first electrode wires,
the plurality of fourth electrode wires are wider than the plurality of third electrode wires, or gaps between the sub-electrodes of the plurality of fourth electrode wires are narrower than gaps between the plurality of third electrode wires, and
the plurality of second electrode wires face the plurality of fourth electrode wires.

17. The sensor device according to claim 13, wherein
at least ones of the plurality of second electrode wires and the plurality of fourth electrode wires include sub-electrodes in areas corresponding to the plurality of second capacitive elements.

18. The sensor device according to claim 17, wherein
ones of the plurality of third electrode wires and the plurality of fourth electrode wires are arranged on the second support layer and include sub-electrodes.

19. The sensor device according to claim 13, wherein
common electrode wires are configured to function as the plurality of second electrode wires and the plurality of fourth electrode wires, respectively.

20. The sensor device according to claim 1, further comprising:
a controller electrically connecting with the first electrode board and the second electrode board, wherein
the controller is configured to generate a control signal in response to an operation input in the first operation input surface based on capacitance change of the plurality of first capacitive elements and capacitance change of the plurality of second capacitive elements.

21. The sensor device according to claim 20, wherein
the controller includes
a first controller device electrically connecting with the first electrode board, and
a second controller device electrically connecting with the second electrode board.

22. The sensor device according to claim 1, wherein
the first sensor further includes a third support layer arranged between the first operation input surface and the first electrode board.

23. The sensor device according to claim 1, further comprising:
a rigid layer arranged between the first sensor and the second sensor, rigidity of the rigid layer being higher than rigidity of the first sensor and rigidity of the second sensor.

24. The sensor device according to claim 23, further comprising:
a protrusion member facing the second sensor, the protrusion member partially supporting the second sensor.

25. The sensor device according to claim 24, wherein
the protrusion member is one of a chassis, a clasp, a circuit board, a wiring, a battery, and a shock-absorbing material.

26. The sensor device according to claim 24, wherein
the plurality of second capacitive elements face the protrusion member.

27. The sensor device according to claim 1, wherein
the second sensor further includes a second operation input surface provided on one of the second electrode board and the second conductor layer.

28. The sensor device according to claim 1, wherein
the first sensor further includes a display unit layered on at least one of the first conductor layer and the first electrode board, and
the first operation input surface is a display surface of the display unit.

29. An input device, comprising:
a first sensor including
a first electrode board including a plurality of first capacitive elements arranged in a matrix,
a first conductor layer facing the first electrode board,
a first support layer arranged between the first electrode board and the first conductor layer, the first support layer being deformable, and
a first operation input surface provided on one of the first electrode board and the first conductor layer,
at least one of the first electrode board and the first conductor layer being flexible;
a second sensor layered on the first sensor, the second sensor including
a second electrode board including a plurality of second capacitive elements,
a second conductor layer facing the second electrode board, and
a second support layer arranged between the second electrode board and the second conductor layer, the second support layer being deformable,
at least one of the second electrode board and the second conductor layer being flexible; and
a controller electrically connecting with the first electrode board and the second electrode board, the controller being configured to generate a control signal in response to an operation input in the first operation input surface based on capacitance change of the plurality of first capacitive elements and capacitance change of the plurality of second capacitive elements.

30. An electronic apparatus, comprising:
a first sensor including
a first electrode board including a plurality of first capacitive elements arranged in a matrix,
a first conductor layer facing the first electrode board, and
a first support layer arranged between the first electrode board and the first conductor layer, the first support layer being deformable,
at least one of the first electrode board and the first conductor layer being flexible;
a second sensor layered on the first sensor, the second sensor including
a second electrode board including a plurality of second capacitive elements,
a second conductor layer facing the second electrode board, and
a second support layer arranged between the second electrode board and the second conductor layer, the second support layer being deformable,
at least one of the second electrode board and the second conductor layer being flexible;
a display unit including an operation input surface, the display unit being provided on the first sensor; and
a controller electrically connecting with the first electrode board and the second electrode board, the controller being configured to generate a control signal in response to an operation input in the first operation input surface based on capacitance change of the plurality of first capacitive elements and capacitance change of the plurality of second capacitive elements.

* * * * *